US012097720B2

(12) United States Patent
Loginov et al.

(10) Patent No.: US 12,097,720 B2
(45) Date of Patent: Sep. 24, 2024

(54) MAGNETIC ASSEMBLIES AND PROCESSES FOR PRODUCING OPTICAL EFFECT LAYERS COMPRISING ORIENTED NON-SPHERICAL OBLATE MAGNETIC OR MAGNETIZABLE PIGMENT PARTICLES

(71) Applicant: SICPA HOLDING SA, Prilly (CH)

(72) Inventors: Evgeny Loginov, Renens (CH); Claude-Alain Despland, Prilly (CH)

(73) Assignee: SICPA HOLDING SA, Prilly (CH)

( * ) Notice: Subject to any disclaimer, the term of this patent is extended or adjusted under 35 U.S.C. 154(b) by 463 days.

(21) Appl. No.: 17/429,236

(22) PCT Filed: Jan. 30, 2020

(86) PCT No.: PCT/EP2020/052265
§ 371 (c)(1),
(2) Date: Aug. 6, 2021

(87) PCT Pub. No.: WO2020/160993
PCT Pub. Date: Aug. 13, 2020

(65) Prior Publication Data

US 2022/0134794 A1 May 5, 2022

(30) Foreign Application Priority Data

Feb. 8, 2019 (EP) .................................... 19156150

(51) Int. Cl.
*B42D 25/369* (2014.01)
*B05D 3/00* (2006.01)
(Continued)

(52) U.S. Cl.
CPC ........... *B42D 25/369* (2014.10); *B05D 3/207* (2013.01); *B05D 5/065* (2013.01); *B42D 25/364* (2014.10); *B42D 25/405* (2014.10); *H01F 7/0273* (2013.01)

(58) Field of Classification Search
None
See application file for complete search history.

(56) References Cited

U.S. PATENT DOCUMENTS 2,570,856 A 10/1951 Pratt et al.
3,676,273 A 7/1972 Graves
(Continued)

FOREIGN PATENT DOCUMENTS

CN 103119521 5/2013
CN 108348952 7/2018
(Continued)

OTHER PUBLICATIONS

"Chemistry & Technology of UV & EB Formulation for Coatings, Inks & Paints", vol. IV, Formulation, by C. Lowe, G. Webster, S. Kessel and I. McDonald, 1996 by John Wiley & Sons in association with SITA Technology Limited.
(Continued)

*Primary Examiner* — Jethro M. Pence
(74) *Attorney, Agent, or Firm* — Muncy, Geissler, Olds & Lowe, P.C.

(57) ABSTRACT

The present invention relates to the field of magnetic assemblies and processes for producing optical effect layers (OELs) comprising magnetically oriented non-spherical oblate magnetic or magnetizable pigment particles on a substrate. In particular, the present invention relates to magnetic assemblies processes for producing said OELs as anti-counterfeit means on security documents or security articles or for decorative purposes.

18 Claims, 9 Drawing Sheets

(51) Int. Cl.

| | |
|---|---|
| ***B05D 5/06*** | (2006.01) |
| ***B42D 25/364*** | (2014.01) |
| ***B42D 25/405*** | (2014.01) |
| ***H01F 7/02*** | (2006.01) |

(56) References Cited

U.S. PATENT DOCUMENTS

| | | | | |
|---|---|---|---|---|
| 3,791,864 | A | 2/1974 | Steingroever | |
| 4,838,648 | A | 6/1989 | Phillips et al. | |
| 5,364,689 | A | 11/1994 | Kashiwagi et al. | |
| 5,630,877 | A | 5/1997 | Kashiwagi et al. | |
| 6,410,130 | B1 | 6/2002 | Schuhmacher et al. | |
| 6,531,221 | B1 | 3/2003 | Schuhmacher et al. | |
| 6,582,781 | B1 | 6/2003 | Schumacher et al. | |
| 6,838,166 | B2 | 1/2005 | Phillips et al. | |
| 8,137,762 | B2 * | 3/2012 | Raksha | C09D 7/69 427/547 |
| 9,027,479 | B2 * | 5/2015 | Raksha | B41M 1/00 118/640 |
| 9,659,696 | B2 * | 5/2017 | Loginov | B42D 25/369 |
| 9,724,956 | B2 * | 8/2017 | Schmid | B44F 1/10 |
| 9,834,028 | B2 * | 12/2017 | Degott | C09D 11/037 |
| 9,849,713 | B2 * | 12/2017 | Schmid | B41M 3/148 |
| 9,933,640 | B2 * | 4/2018 | Degott | B42D 25/20 |
| 10,052,903 | B2 * | 8/2018 | Loginov | B42D 25/364 |
| 10,279,618 | B2 * | 5/2019 | Degott | B42D 25/378 |
| 10,328,739 | B2 * | 6/2019 | Loginov | B42D 25/29 |
| 10,391,519 | B2 * | 8/2019 | Degott | H01F 41/16 |
| 10,500,889 | B2 * | 12/2019 | Li | B42D 25/369 |
| 10,682,877 | B2 * | 6/2020 | Schmid | H01F 7/0273 |
| 10,737,526 | B2 * | 8/2020 | Loginov | H01F 41/16 |
| 10,850,305 | B2 | 12/2020 | Loginov et al. | |
| 10,906,066 | B2 * | 2/2021 | Loginov | B05D 3/207 |
| 10,981,401 | B2 * | 4/2021 | Loginov | B42D 25/369 |
| 11,065,866 | B2 * | 7/2021 | Loginov | B41F 13/10 |
| 11,065,906 | B2 * | 7/2021 | Amerasinghe | B42D 25/369 |
| 11,110,487 | B2 * | 9/2021 | Mueller | B05D 3/207 |
| 11,292,027 | B2 * | 4/2022 | Nikseresht Ghanepour | B05D 3/065 |
| 11,420,230 | B2 * | 8/2022 | Amerasinghe | B05D 3/065 |
| 11,577,272 | B2 * | 2/2023 | Amerasinghe | B05D 5/065 |
| 11,577,273 | B2 * | 2/2023 | Nikseresht Ghanepour | C09D 4/00 |
| 11,618,053 | B2 * | 4/2023 | Loginov | B05D 5/065 264/429 |
| 11,660,902 | B2 * | 5/2023 | Amerasinghe | B05D 3/207 428/323 |
| 11,691,449 | B2 * | 7/2023 | Schmid | B41F 19/005 427/514 |
| 11,707,764 | B2 * | 7/2023 | Nikseresht Ghanepour | B42D 25/369 427/547 |
| 11,772,404 | B2 * | 10/2023 | Schmid | B42D 25/369 101/36 |
| 2005/0106367 | A1 | 5/2005 | Raksha et al. | |
| 2010/0040845 | A1 * | 2/2010 | Schmid | B42D 25/324 118/640 |
| 2011/0137628 | A1 * | 6/2011 | Kjerstad | G01V 3/38 703/2 |
| 2012/0059585 | A1 * | 3/2012 | Kjerstad | G01V 3/083 702/6 |
| 2012/0168515 | A1 | 7/2012 | Schutzmann et al. | |
| 2013/0183067 | A1 | 7/2013 | Degott et al. | |
| 2015/0146280 | A1 * | 5/2015 | Degott | G02F 1/0036 427/547 |
| 2015/0217307 | A1 * | 8/2015 | Raksha | B05D 5/061 118/640 |
| 2017/0305184 | A1 * | 10/2017 | Muller | B05D 5/065 |
| 2019/0283079 | A1 * | 9/2019 | Degott | B42D 25/378 |
| 2021/0319937 | A1 * | 10/2021 | Nikseresht Ghanepour | H01F 7/0252 |
| 2021/0323335 | A1 * | 10/2021 | Benninger | B42D 25/41 |
| 2022/0134794 | A1 * | 5/2022 | Loginov | H01F 7/0273 283/82 |
| 2022/0144005 | A1 * | 5/2022 | Loginov | B42D 25/369 |
| 2022/0388327 | A1 * | 12/2022 | Loginov | B05D 3/067 |
| 2022/0402293 | A1 * | 12/2022 | Loginov | G02F 1/0081 |
| 2022/0403177 | A1 * | 12/2022 | Rahm | C09C 1/0021 |
| 2023/0001735 | A1 * | 1/2023 | Rahm | C09C 1/62 |
| 2023/0191452 | A1 * | 6/2023 | Loginov | B05D 5/065 264/429 |
| 2023/0201872 | A1 * | 6/2023 | Loginov | H01F 7/0205 427/514 |
| 2023/0364639 | A1 * | 11/2023 | Pittet | B05D 7/542 |

FOREIGN PATENT DOCUMENTS

| | | | | |
|---|---|---|---|---|
| DE | 10 2013 015277 | A1 * | 3/2015 | B05D 3/207 |
| EP | 0556449 | A1 | 8/1993 | |
| EP | 0686675 | B1 | 2/1998 | |
| EP | 1666546 | A2 | 6/2006 | |
| EP | 1710756 | A1 | 10/2006 | |
| EP | 2402401 | A1 | 1/2012 | |
| WO | 02/073250 | A2 | 9/2002 | |
| WO | 03/000801 | A2 | 1/2003 | |
| WO | 2005/002866 | A1 | 1/2005 | |
| WO | 2006/063926 | A1 | 6/2006 | |
| WO | 2007/131833 | A1 | 11/2007 | |
| WO | 2008/046702 | A1 | 4/2008 | |
| WO | 2008/139373 | A1 | 11/2008 | |
| WO | 2013/167425 | A1 | 11/2013 | |
| WO | 2014/108303 | A1 | 7/2014 | |
| WO | 2014/198905 | A2 | 12/2014 | |
| WO | 2017/080698 | A1 | 5/2017 | |
| WO | 2017/148789 | A1 | 9/2017 | |
| WO | 2018/019594 | A1 | 2/2018 | |
| WO | 2018/033512 | A1 | 2/2018 | |
| WO | 2018/045230 | A1 | 3/2018 | |
| WO | 2018/045233 | A1 | 3/2018 | |
| WO | 2018/054819 | A1 | 3/2018 | |

OTHER PUBLICATIONS

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

Benenson et al., Handbook of Physics, Springer 2002, pp. 463-464.

International Search Report and Written Opinion issued with respect to application No. PCT/EP2020/052265.

Notification of First Chinese Office Action in counterpart Chinese Patent Application No. 202080013224.X dated Jun. 22, 2022 (and English language translation of Office Action).

* cited by examiner

MAGNETIC ASSEMBLIES AND PROCESSES FOR PRODUCING OPTICAL EFFECT LAYERS COMPRISING ORIENTED NON-SPHERICAL OBLATE MAGNETIC OR MAGNETIZABLE PIGMENT PARTICLES

FIELD OF THE INVENTION

The present invention relates to the field of the protection of value documents and value or branded commercial goods against counterfeit and illegal reproduction. In particular, the present invention relates to processes for producing optical effect layers (OELs) showing a viewing-angle dynamic appearance and optical effect layer, as well as to uses of said OELs as anti-counterfeit means on documents and articles.

BACKGROUND OF THE INVENTION

The use of inks, coating compositions, coatings, or layers, containing magnetic or magnetizable pigment particles, in particular non-spherical optically variable magnetic or magnetizable pigment particles, for the production of security elements and security documents is known in the art.

Security features for security documents and articles can be classified into "covert" and "overt" security features. The protection provided by covert security features relies on the concept that such features are hidden to the human senses, typically requiring specialized equipment and knowledge for their detection, whereas "overt" security features are easily detectable with the unaided human senses. Such features may be visible and/or detectable via the tactile senses while still being difficult to produce and/or to copy. However, the effectiveness of overt security features depends to a great extent on their easy recognition as a security feature, because users will only then actually perform a security check based on such security feature if they are aware of its existence and nature.

Coatings or layers comprising oriented magnetic or magnetizable pigment particles are disclosed for example in U.S. Pat. Nos. 2,570,856; 3,676,273; 3,791,864; 5,630,877 and 5,364,689. Magnetic or magnetizable pigment particles in coatings allow for the production of magnetically induced images, designs and/or patterns through the application of a corresponding magnetic field, causing a local alignment of the magnetic or magnetizable pigment particles in the unhardened coating, followed by hardening the latter to fix the particles in their positions and orientations. This results in specific optical effects, i.e. fixed magnetically induced images, designs or patterns which are highly resistant to counterfeiting. The security elements based on oriented magnetic or magnetizable pigment particles can only be produced by having access to both, the magnetic or magnetizable pigment particles or a corresponding ink or coating composition comprising said particles, and the particular technology employed for applying said ink or coating composition and for orienting said pigment particles in the applied ink or coating composition, followed by hardening said ink or composition.

A particularly striking optical effect can be achieved if a security feature changes its appearance upon a change in viewing conditions, such as the viewing angle. One example is the so-called "rolling bar" effect, as disclosed in US 2005/0106367. A "rolling bar" effect (FIG. 1A) is based on pigment particles orientation imitating a curved surface across the coating. The observer sees a specular reflection zone which moves away or towards the observer as the security feature is tilted. A so-called positive rolling bar comprises pigment particles oriented in a concave fashion (FIG. 1C) and follows a positively curved surface; a positive rolling bar moves with the rotation sense of tilting. A so-called negative rolling bar comprises pigment particles oriented in a convex fashion (FIG. 1B) and follows a negatively curved surface; a negative rolling bar moves against the rotation sense of tilting. A hardened coating comprising pigment particles having an orientation following a concave curvature (positive curve orientation), shows a visual effect characterized by an upward movement of the rolling bar (positive rolling bar) when the support is tilted backwards. The concave curvature refers to the curvature as seen by an observer viewing the hardened coating from the side of the support carrying the hardened coating (FIG. 1C). A hardened coating comprising pigment particles having an orientation following a convex curvature (negative curve orientation, FIG. 1B) shows a visual effect characterized by a downward movement of the rolling bar (negative rolling bar) when the support carrying the hardened coating is tilted backwards (i.e. the top of the support moves away from the observer while the bottom of the support moves towards from the observer) (FIG. 1A). This effect is nowadays utilized for a number of security elements on banknotes, such as on the "5" and the "10" of the 5 respectively 10 Euro banknote.

Another example of a security feature having a dynamic optical effect wherein said dynamic effect exhibits a band of light reflected from the magnetically oriented pigment particles moving when said feature is tilted is disclosed in WO 2018/045233 A1. WO 2018/045233 A1 discloses a dynamic optical effect wherein a band of light is reflected, said moving occurring in directions that are perpendicular to the direction in which said feature is tilted. Said dynamic optical effect disclosed in WO 2018/045233 A1 is called ortho-parallactic optical effect. An ortho-parallactic optical effect can be described as an optical effect in which an optical feature such as a band that appears brighter or darker than other sections of the security feature appears to move across the security feature in a direction that is orthogonal to the tilting direction of the security feature. Thus, for instance, when the security feature is tilted sideways (for example about a latitudinal axis), the optical feature may appear to move in a longitudinal direction. WO 2018/045230 A1 further discloses apparatuses and methods for orienting magnetic flakes to produce security features on a substrate exhibiting an ortho-parallactic optical effect, wherein the magnetically-orientable flakes are subjected to a magnetic field and are fixed in the desired orientations through the use of a mask containing at least one opening, in which the mask and the at least one opening may be strategically positioned with respect to the magnetic field to cause the magnetically-orientable flakes to be fixed at a desired dihedral angle with respect to the substrate by a radiation source.

A need remains for magnetic assemblies and processes for producing optical effect layers (OELs) based on oriented magnetic or magnetizable pigment particles in inks or coating compositions, wherein said magnetic assemblies and processes are reliable, easy to implement and able to work at a high production speed while allowing the production of OELs exhibiting an ortho-parallactic eye-catching effect and being difficult to produce on a mass-scale with the equipment available to a counterfeiter.

SUMMARY OF THE INVENTION

Accordingly, it is an object of the present invention to provide magnetic assemblies (x00) for producing an optical effect layer (OEL) on a substrate (x20) surface, said optical effect layer (OEL) exhibiting an ortho-parallactic effect and said assembly (x00) comprising:

a) a first magnetic-field generating device (x30) comprising n sets of spaced apart bar dipole magnets (x31), preferably n sets of two or more spaced apart bar dipole magnets (x31), with n being an integer equal to or bigger than 1, wherein each of said bar dipole magnets (x31) has its North-South magnetic axis substantially parallel to the substrate (x20) surface, wherein, for each set of said n sets, the bar dipole magnets (x31) have their North pole pointing in a same direction and are substantially parallel to each other, and wherein the bar dipole magnets (x31) of the first magnetic-field generating device (x30) are at least partially or fully embedded in a polygonal-shaped supporting matrix (x32), and b) a second magnetic-field generating device (x40) comprising one or more square-shaped or rectangle-shaped dipole magnets (x41) having their North-South magnetic axis substantially parallel to the substrate (x20) surface;

wherein the vector sum H1 of the magnetic axes of the bar dipole magnets (x31) of the first magnetic-field generating device (x30) and the vector sum H2 of the one or more square-shaped or rectangle-shaped dipole magnets (x41) form an angle α in the range from about 5° to about 175° or in the range from about 185° to about 355°, preferably in the range from about 60° to about 120° or in the range from about 240° to about 300°.

The first magnetic-field generating device (x30) described herein is placed below or on top of the second magnetic-field generating device (x40) described herein.

The first magnetic-field generating device (x30) described herein and the second magnetic-field generating device (x40) described herein may be essentially centered with respect to one another.

Also described herein are uses of the magnetic assemblies (x00) described herein for producing an optical effect layer (OEL) on a substrate.

Also described herein are printing apparatuses comprising a rotating magnetic cylinder comprising at least one of the magnetic assemblies (x00) described herein and printing apparatuses comprising a flatbed printing unit comprising at least one of the magnetic assemblies (x00) described herein, wherein said printing apparatuses are suitable for producing the optical effect layer (OEL) described herein on a substrate such as those described herein. Also described herein are uses of the printing apparatuses described herein for producing the optical effect layer (OEL) described herein on a substrate such as those described herein.

Also described herein are processes for producing the optical effect layer (OEL) described herein on a substrate (x20), the OEL exhibiting an ortho-parallactic effect, and OELs obtained thereof. Said processes comprise the steps of:

i) applying on a substrate (x20) surface a radiation curable coating composition comprising non-spherical oblate magnetic or magnetizable pigment particles, said radiation curable coating composition being in a first state so as to form a coating layer (x10);

ii) exposing the radiation curable coating composition to a magnetic field of a static magnetic assembly (x00) described herein so as to orient at least a part of the non-spherical oblate magnetic or magnetizable pigment particles;

iii) at least partially curing the radiation curable coating composition of step ii) to a second state so as to fix the non-spherical oblate magnetic or magnetizable pigment particles in their adopted positions and orientations.

Also described herein are methods of manufacturing a security document or a decorative element or object, comprising a) providing a security document or a decorative element or object, and b) providing an optical effect layer (OEL) such as those described herein, in particular such as those obtained by the process described herein, so that it is comprised by the security document or decorative element or object.

BRIEF DESCRIPTION OF DRAWINGS

FIG. 2D-3 illustrates the angle α between the vector sum H1 of the magnetic axes of the bar dipole magnets (231-*a*1, 231-*a*2) of the first magnetic-field generating device (230) and the vector sum H2 of the square-shaped dipole magnet (241).

FIG. 3D1-D3 schematically illustrate the vectors and the vector sum H1 of the magnetic axes of the two bar dipole magnets (331-*a*1, 331-*a*2) of the first magnetic-field generating device (330). FIG. 3D-3 illustrates the angle α between the vector sum H1 of the magnetic axes of the bar dipole magnets (331-*a*1, 331-*a*2) of the first magnetic-field generating device (330) and the vector sum H2 of the square-shaped dipole magnet (341).

FIG. 4D1-D3 schematically illustrate the vectors and the vector sum H1 of the magnetic axes of the four bar dipole magnets (431-*a*1, 431-*a*2, 431-*b*1, 431-*b*2) of the first magnetic-field generating device (430). FIG. 4D-3 illustrates the angle α between the vector sum H1 of the magnetic axes of the bar dipole magnets (431-*a*1, 431-*a*2, 431-*b*1, 431-*b*2) of the first magnetic-field generating device (430) and the vector sum H2 of the square-shaped dipole magnet (441).

FIG. 5D1-D3 schematically illustrate the vectors and the vector sum H1 of the magnetic axes of the four bar dipole magnets (531-*a*1, 531-*a*2, 531-*b*1, 531-*b*2) of the first magnetic-field generating device (530). FIG. 5D-3 illustrates the angle α between the vector sum H1 of the magnetic axes of the bar dipole magnets (531-*a*1, 531-*a*2, 531-*b*1, 531-*b*2) of the first magnetic-field generating device (530) and the vector sum H2 of the square-shaped dipole magnet (541).

DETAILED DESCRIPTION

Definitions

Figure 1A:
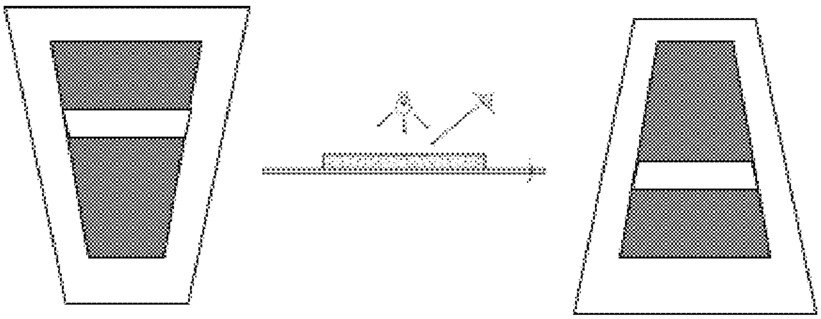
FIG. 1A schematically illustrates a "rolling bar" effect and FIG. 1B-C schematically illustrate the pigment particles orientation of a "rolling bar" effect (negative rolling bar in FIG. 1B and positive rolling bar in FIG. 1C) on a substrate (S).
Figure 1B:
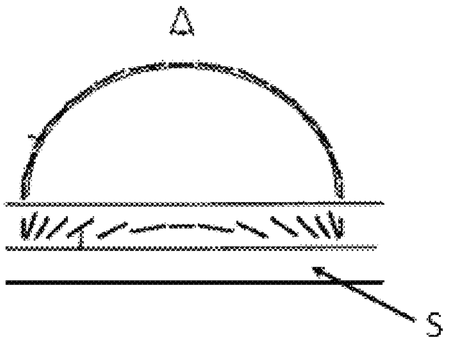
FIG. 2D1-D3 schematically illustrate the vectors and the vector sum H1 of the magnetic axes of the two bar dipole magnets (231-*a*1, 231-*a*2) of the first magnetic-field generating device (230).
Figure 1C:
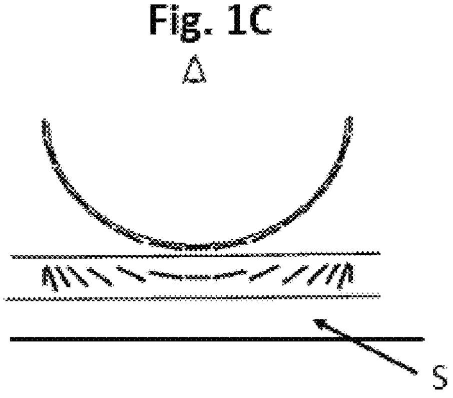

The following definitions apply to the meaning of the terms employed in the description and recited in the claims.

As used herein, the indefinite article “a” indicates one as well as more than one, and does not necessarily limit its referent noun to the singular.

As used herein, the term “about” means that the amount or value in question may be the specific value designated or some other value in its neighborhood. Generally, the term “about” denoting a certain value is intended to denote a range within ±5% of that value. As one example, the phrase “about 100” denotes a range of 100±5, i.e. the range from 95 to 105. Generally, when the term “about” is used, it can be expected that similar results or effects according to the invention can be obtained within a range of ±5% of the indicated value.

The term “substantially parallel” refers to deviating not more than 10° from parallel alignment and the term “substantially perpendicular” refers to deviating not more than 10° from perpendicular alignment.

As used herein, the term “and/or” means that either both or only one of the elements linked by the term is present. For example, “A and/or B” shall mean “only A, or only B, or both A and B”. In the case of “only A”, the term also covers the possibility that B is absent, i.e. “only A, but not B”.

The term “comprising” as used herein is intended to be non-exclusive and open-ended. Thus, for instance solution composition comprising a compound A may include other compounds besides A. However, the term “comprising” also covers, as a particular embodiment thereof, the more restrictive meanings of “consisting essentially of” and “consisting of”, so that for instance “a composition comprising A, B and optionally C” may also (essentially) consist of A and B, or (essentially) consist of A, B and C.

The term “coating composition” refers to any composition which is capable of forming a coating, in particular an optical effect layer (OEL) described herein, on a solid substrate, and which can be applied, preferably but not exclusively, by a printing method. The coating composition described herein comprises at least a plurality of non-spherical oblate magnetic or magnetizable pigment particles and a binder.

The term “optical effect layer (OEL)” as used herein denotes a layer that comprises at least a plurality of magnetically oriented non-spherical oblate magnetic or magnetizable pigment particles and a binder, wherein the non-spherical oblate magnetic or magnetizable pigment particles are fixed or frozen (fixed/frozen) in position and orientation within said binder.

A “pigment particle”, in the context of the present disclosure, designates a particulate material, which is insoluble in the ink or coating composition, and which provides the latter with a determined spectral transmission/reflection response.

The term "magnetic direction" denotes the direction of the magnetic field vector along a magnetic field line pointing, at the exterior of a magnet, from its North pole to its South pole (see Handbook of Physics, Springer 2002, pages 463-464).

The term "curing" denotes a process which increases the viscosity of a coating composition as a reaction to a stimulus, to convert the coating composition into a state where the therein comprised magnetic or magnetizable pigment particles are fixed/frozen in their positions and orientations and can no longer move nor rotate (i.e. a cured, hardened or solid state).

As used herein, the term "at least" defines a determined quantity or more than said quantity, for example "at least one" means one, two or three, etc.

The term "security document" refers to a document which is protected against counterfeit or fraud by at least one security feature. Examples of security documents include, without limitation, currency, value documents, identity documents, etc.

The term "security feature" denotes an overt or a covert image, pattern, or graphic element that can be used for the authentication of the document or article carrying it.

Where the present description refers to "preferred" embodiments/features, combinations of these "preferred" embodiments/features shall also be deemed to be disclosed as preferred, as long as this combination of "preferred" embodiments/features is technically meaningful.

The present invention provides magnetic assemblies (x00) and processes using said magnetic assemblies (x00) suitable for producing optical effect layers (OELs), said OELs comprising a plurality of non-randomly oriented non-spherical oblate magnetic or magnetizable pigment particles, said pigment particles being dispersed within a hardened/cured material and optical effects layers (OELs) obtained thereof. Thanks to the orientation pattern of said magnetic or magnetizable pigment particle, the optical OEL described herein provides the optical impression of an ortho-parallactic effect, i.e. in the present case under the form of a bright reflective vertical bar moving in a longitudinal direction when the substrate carrying said OEL is tilted about a horizontal/latitudinal axis or moving in a horizontal/latitudinal direction when the substrate carrying said OEL is tilted about a longitudinal axis.

The present invention provides processes and methods for producing the optical effect layer (OEL) described herein on the substrate described herein, and the optical effect layers (OELs) obtained therewith. wherein said methods comprise a step i) of applying on the substrate surface the radiation curable coating composition comprising non-spherical oblate magnetic or magnetizable pigment particles described herein, said radiation curable coating composition being in a first state, i.e. a liquid or pasty state, wherein the radiation curable coating composition is wet or soft enough, so that the non-spherical oblate magnetic or magnetizable pigment particles dispersed in the radiation curable coating composition are freely movable, rotatable and/or orientable upon exposure to the magnetic field.

The step i) described herein may be carried by a coating process such as for example roller and spray coating processes or by a printing process. Preferably, the step i) described herein is carried out by a printing process preferably selected from the group consisting of screen printing, rotogravure printing, flexography printing, inkjet printing and intaglio printing (also referred in the art as engraved copper plate printing and engraved steel die printing), more preferably selected from the group consisting of screen printing, rotogravure printing and flexography printing.

Subsequently to, partially simultaneously with or simultaneously with the application of the radiation curable coating composition described herein on the substrate surface described herein (step i)), at least a part of the non-spherical oblate magnetic or magnetizable pigment particles are oriented (step ii)) by exposing the radiation curable coating composition to the magnetic field of the magnetic assembly (x00) described herein and being static, so as to align at least part of the non-spherical oblate magnetic or magnetizable pigment particles along the magnetic field lines generated by the assembly (x00).

Subsequently to or partially simultaneously with the step of orienting/aligning at least a part of the non-spherical oblate magnetic or magnetizable pigment particles by applying the magnetic field described herein, the orientation of the non-spherical oblate magnetic or magnetizable pigment particles is fixed or frozen. The radiation curable coating composition must thus noteworthy have a first state, i.e. a liquid or pasty state, wherein the radiation curable coating composition is wet or soft enough, so that the non-spherical oblate magnetic or magnetizable pigment particles dispersed in the radiation curable coating composition are freely movable, rotatable and/or orientable upon exposure to the magnetic field, and a second cured (e.g. solid) state, wherein the non-spherical oblate magnetic or magnetizable pigment particles are fixed or frozen in their respective positions and orientations.

Accordingly, the processes for producing an optical effect layer (OEL) on the substrate described herein comprises a step iii) of at least partially curing the radiation curable coating composition of step ii) to a second state so as to fix the non-spherical oblate magnetic or magnetizable pigment particles in their adopted positions and orientations. The step iii) of at least partially curing the radiation curable coating composition may be carried out subsequently to or partially simultaneously with the step of orienting/aligning at least a part of the non-spherical oblate magnetic or magnetizable pigment particles by applying the magnetic field described herein (step ii)). Preferably, the step iii) of at least partially curing the radiation curable coating composition is carried out partially simultaneously with the step of orienting/aligning at least a part of the non-spherical oblate magnetic or magnetizable pigment particles by applying the magnetic field described herein (step ii)). By "partially simultaneously", it is meant that both steps are partly performed simultaneously, i.e. the times of performing each of the steps partially overlap. In the context described herein, when curing is performed partially simultaneously with the orientation step ii), it must be understood that curing becomes effective after the orientation so that the pigment particles have the time to orient before the complete or partial curing or hardening of the OEL.

The first and second states of the radiation curable coating composition are provided by using a certain type of radiation curable coating composition. For example, the components of the radiation curable coating composition other than the non-spherical oblate magnetic or magnetizable pigment particles may take the form of an ink or radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical oblate magnetic or magnetizable pigment particles are fixed in their current positions and orientations and can no longer move nor rotate within the binder material.

As known to those skilled in the art, ingredients comprised in a radiation curable coating composition to be applied onto a surface such as a substrate and the physical properties of said radiation curable coating composition must fulfil the requirements of the process used to transfer the radiation curable coating composition to the substrate surface. Consequently, the binder material comprised in the radiation curable coating composition described herein is typically chosen among those known in the art and depends on the coating or printing process used to apply the radiation curable coating composition and the chosen radiation curing process.

In the optical effect layers (OELs) described herein, the non-spherical oblate magnetic or magnetizable pigment particles described herein are dispersed in the cured/hardened radiation curable coating composition comprising a cured binder material that fixes/freezes the orientation of the magnetic or magnetizable pigment particles. The cured binder material is at least partially transparent to electromagnetic radiation of a range of wavelengths comprised between 200 nm and 2500 nm. The binder material is thus, at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum, such that the particles comprised in the binder material in its cured or solid state and their orientation-dependent reflectivity can be perceived through the binder material. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the platelet-shaped magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical oblate magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range. The infrared, visible and UV portions of the electromagnetic spectrum approximately correspond to the wavelength ranges between 700-2500 nm, 400-700 nm, and 200-400 nm respectively.

As mentioned hereabove, the radiation curable coating composition described herein depends on the coating or printing process used to apply said radiation curable coating composition and the chosen curing process. Preferably, curing of the radiation curable coating composition involves a chemical reaction which is not reversed by a simple temperature increase (e.g. up to 80° C.) that may occur during a typical use of an article comprising the OEL described herein. The term "curing" or "curable" refers to processes including the chemical reaction, crosslinking or polymerization of at least one component in the applied radiation curable coating composition in such a manner that it turns into a polymeric material having a greater molecular weight than the starting substances. Radiation curing advantageously leads to an instantaneous increase in viscosity of the radiation curable coating composition after exposure to the curing irradiation, thus preventing any further movement of the pigment particles and in consequence any loss of information after the magnetic orientation step. Preferably, the curing step (step iii)) is carried out by radiation curing including UV-visible light radiation curing or by E-beam radiation curing, more preferably by UV-Vis light radiation curing.

Therefore, suitable radiation curable coating compositions for the present invention include radiation curable compositions that may be cured by UV-visible light radiation (hereafter referred as UV-Vis light radiation) or by E-beam radiation (hereafter referred as EB radiation). Radiation curable compositions are known in the art and can be found in standard textbooks such as the series "Chemistry & Technology of UV & EB Formulation for Coatings, Inks & Paints", Volume IV, Formulation, by C. Lowe, G. Webster, S. Kessel and I. McDonald, 1996 by John Wiley & Sons in association with SITA Technology Limited. According to one particularly preferred embodiment of the present invention, the radiation curable coating composition described herein is a UV-Vis radiation curable coating composition. Therefore, a radiation curable coating composition comprising non-spherical oblate magnetic or magnetizable pigment particles described herein is preferably at least partially cured by UV-Vis light radiation, preferably by narrow-bandwidth LED light in the UV-A (315-400 nm) or blue (400-500 nm) spectral region, most preferable by a high-power LED source emitting in the 350 nm to 450 nm spectral region, with a typical emission bandwidth in the 20 nm to 50 nm range. UV radiation from mercury vapor lamps or doped mercury lamps can also be used to increase the curing rate of the radiation curable coating composition.

Preferably, the UV-Vis radiation curable coating composition comprises one or more compounds selected from the group consisting of radically curable compounds and cationically curable compounds. The UV-Vis radiation curable coating composition described herein may be a hybrid system and comprise a mixture of one or more cationically curable compounds and one or more radically curable compounds. Cationically curable compounds are cured by cationic mechanisms typically including the activation by radiation of one or more photoinitiators which liberate cationic species, such as acids, which in turn initiate the curing so as to react and/or cross-link the monomers and/or oligomers to thereby cure the radiation curable coating composition. Radically curable compounds are cured by free radical mechanisms typically including the activation by radiation of one or more photoinitiators, thereby generating radicals which in turn initiate the polymerization so as to cure the radiation curable coating composition. Depending on the monomers, oligomers or prepolymers used to prepare the binder comprised in the UV-Vis radiation curable coating compositions described herein, different photoinitiators might be used. Suitable examples of free radical photoinitiators are known to those skilled in the art and include without limitation acetophenones, benzophenones, benzyldimethyl ketals, alpha-aminoketones, alpha-hydroxyketones, phosphine oxides and phosphine oxide derivatives, as well as mixtures of two or more thereof. Suitable examples of cationic photoinitiators are known to those skilled in the art art and include without limitation onium salts such as organic iodonium salts (e.g. diaryl iodoinium salts), oxonium (e.g. triaryloxonium salts) and sulfonium salts (e.g. triarylsulphonium salts), as well as mixtures of two or more thereof. Other examples of useful photoinitiators can be found in standard textbooks such as "Chemistry & Technology of UV & EB Formulation for Coatings, Inks & Paints", Volume III, is "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited. It may also be advantageous to include a sensitizer in conjunction with the one or more photoinitiators in order to achieve efficient curing. Typical examples of suitable photosensitizers include without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures of two or more thereof. The one or more photoinitiators comprised in the UV-Vis radiation curable coating compositions are preferably present in a total amount from about 0.1 wt-% to about 20 wt-%, more preferably about 1 wt-% to about 15 wt-%, the weight percents being based on the total weight of the UV-Vis radiation curable coating compositions.

The radiation curable coating composition described herein may further comprise one or more marker substances or taggants and/or one or more machine readable materials selected from the group consisting of magnetic materials (different from the platelet-shaped magnetic or magnetizable pigment particles described herein), luminescent materials, electrically conductive materials and infrared-absorbing materials. As used herein, the term "machine readable material" refers to a material which can be comprised in a layer so as to confer a way to authenticate said layer or article comprising said layer by the use of a particular equipment for its authentication.

The radiation curable coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the radiation curable coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the shelf life (polymerization inhibitors), the gloss etc. Additives described herein may be present in the radiation curable coating composition in amounts and in forms known in the art, including so-called nano-materials where at least one of the dimensions of the additive is in the range of 1 to 1000 nm.

The radiation curable coating composition described herein comprises the non-spherical oblate magnetic or magnetizable pigment particles described herein. Preferably, the non-spherical oblate magnetic or magnetizable pigment particles are present in an amount from about 2 wt-% to about 40 wt-%, more preferably about 4 wt-% to about 30 wt-%, the weight percents being based on the total weight of the radiation curable coating composition comprising the binder material, the non-spherical oblate magnetic or magnetizable pigment particles and other optional components of the radiation curable coating composition.

Non-spherical oblate magnetic or magnetizable pigment particles described herein are defined as having, due to their non-spherical oblate shape, non-isotropic reflectivity with respect to an incident electromagnetic radiation for which the cured or hardened binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical oblate magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

The non-spherical oblate magnetic or magnetizable pigment particles described herein are preferably platelet-shaped magnetic or magnetizable pigment particles.

Suitable examples of non-spherical oblate magnetic or magnetizable pigment particles described herein include without limitation pigment particles comprising a magnetic metal selected from the group consisting of cobalt (Co), iron (Fe), gadolinium (Gd) and nickel (Ni); magnetic alloys of iron, manganese, cobalt, nickel and mixtures of two or more thereof; magnetic oxides of chromium, manganese, cobalt, iron, nickel and mixtures of two or more thereof; and mixtures of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical oblate magnetic or magnetizable pigment particles described herein include without limitation pigment particles comprising a magnetic layer M made from one or more of a magnetic metal such as cobalt (Co), iron (Fe), gadolinium (Gd) or nickel (Ni); and a magnetic alloy of iron, cobalt or nickel, wherein said platelet-shaped magnetic or magnetizable pigment particles may be multilayered structures comprising one or more additional layers. Preferably, the one or more additional layers are layers A independently made from one or more materials selected from the group consisting of metal fluorides such as magnesium fluoride ($MgF_2$), silicon oxide (SiO), silicon dioxide ($SiO_2$), titanium oxide ($TiO_2$), zinc sulphide (ZnS) and aluminum oxide ($Al_2O_3$), more preferably silicon dioxide ($SiO_2$); or layers B independently made from one or more materials selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation NM multilayer structures, A/M/A multilayer structures, A/M/B multilayer structures, A/B/M/A multilayer structures, A/B/M/B multilayer structures, A/B/M/B/A multilayer structures, B/M multilayer structures, B/M/B multilayer structures, B/NM/A multilayer structures, B/A/M/B multilayer structures, B/A/M/B/A/multilayer structures, wherein the layers A, the magnetic layers M and the layers B are chosen from those described hereabove.

At least part of the non-spherical oblate magnetic or magnetizable pigment particles described herein may be constituted by non-spherical oblate optically variable magnetic or magnetizable pigment particles and/or non-spherical oblate magnetic or magnetizable pigment particles having no optically variable properties. Preferably, at least a part of the non-spherical oblate magnetic or magnetizable pigment particles described herein is constituted by non-spherical oblate optically variable magnetic or magnetizable pigment particles. In addition to the overt security provided by the colorshifting property of non-spherical oblate optically variable magnetic or magnetizable pigment particles, which allows easily detecting, recognizing and/or discriminating an article or security document carrying an ink, radiation curable coating composition, coating or layer comprising the non-spherical oblate optically variable magnetic or magnetizable pigment particles described herein from their possible counterfeits using the unaided human senses, the optical properties of the platelet-shaped optically variable magnetic or magnetizable pigment particles may also be used as a machine readable tool for the recognition of the optical effect layer (OEL). Thus, the optical properties of the non-spherical oblate optically variable magnetic or magnetizable pigment particles may simultaneously be used as a covert or semi-covert security feature in an authentication process wherein the optical (e.g. spectral) properties of the pigment particles are analyzed. The use of non-spherical oblate optically variable magnetic or magnetizable pigment particles in radiation curable coating compositions for producing an OEL enhances the significance of the OEL as a security feature in security document applications, because such materials (i.e. non-spherical oblate optically variable magnetic or magnetizable pigment particles) are reserved to the security document printing industry and are not commercially available to the public.

Moreover, and due to their magnetic characteristics, the non-spherical oblate magnetic or magnetizable pigment particles described herein are machine readable, and therefore radiation curable coating compositions comprising those pigment particles may be detected for example with specific magnetic detectors. Radiation curable coating compositions comprising the non-spherical oblate magnetic or magnetizable pigment particles described herein may therefore be used as a covert or semi-covert security element (authentication tool) for security documents.

As mentioned above, preferably at least a part of the non-spherical oblate magnetic or magnetizable pigment particles is constituted by non-spherical oblate optically variable magnetic or magnetizable pigment particles. These can more preferably be selected from the group consisting of non-spherical oblate magnetic thin-film interference pigment particles, non-spherical oblate magnetic cholesteric liquid crystal pigment particles, non-spherical oblate interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/di-electric/reflector/magnetic/dielectric/absorber multilayer structures.

Preferred seven-layer Fabry Perot multilayer structures consist of absorber/dielectric/re-flector/magnetic/reflector/dielectric/absorber multilayer structures such as disclosed in U.S. Pat. No. 4,838,648.

Preferably, the reflector layers described herein are independently made from one or more materials selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more materials selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicon dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more materials selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), iron (Fe), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a Cr/$MgF_2$/Al/M/Al/$MgF_2$/Cr multilayer structure, wherein M a magnetic layer comprising nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 A1 which is hereby incorporated by reference in its entirety.

Magnetic thin film interference pigment particles described herein are typically manufactured by an established deposition technique for the different required layers onto a web. After deposition of the desired number of layers, e.g. by physical vapor deposition (PVD), chemical vapor deposition (CVD) or electrolytic deposition, the stack of layers is removed from the web, either by dissolving a release layer in a suitable solvent, or by stripping the material from the web. The so-obtained material is then broken down to platelet-shaped pigment particles which have to be further processed by grinding, milling (such as for example jet milling processes) or any suitable method so as to obtain pigment particles of the required size. The resulting product consists of flat platelet-shaped pigment particles with broken edges, irregular shapes and different aspect ratios. Further information on the preparation of suitable platelet-shaped magnetic thin film interference pigment particles can be found e.g. in EP 1 710 756 A1 and EP 1 666 546 A1 which are hereby incorporated by reference.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose cholesteric multilayer pigment particles which comprise the sequence $A^1$/B/$A^2$, wherein $A_1$ and $A^2$ may be identical or different and each comprises at least one cholesteric layer, and B is an interlayer absorbing all or some of the light transmitted by the layers $A_1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigments comprising one or more magnetic materials include without limitation structures consisting of a substrate selected from the group consisting of a core coated with one or more layers, wherein at least one of the core or the one or more layers have magnetic properties. For example, suitable interference coated pigments comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical oblate magnetic or magnetizable pigment particles described herein may be surface treated so as to protect them against any deterioration that may occur in the radiation curable coating composition and/or to facilitate their incorporation in the radiation curable coating composition; typically corrosion inhibitor materials and/or wetting agents may be used.

The substrate described herein is preferably selected from the group consisting of papers or other fibrous materials, such as cellulose, paper-comprising materials, glasses, metals, ceramics, plastics and polymers, metalized plastics or polymers, composite materials and mixtures or combinations thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), iron (Fe), nickel (Ni), silver (Ag), combinations thereof or alloys of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as sizing agents, whiteners, processing aids, reinforcing or wet strengthening agents, etc. The substrate described herein may be provided under the form of a web (e.g. a continuous sheet of the materials described hereabove) or under the form of sheets. Should the optical effect layer (OEL) produced according to the present invention be on a security document, and with the aim of further increasing the security level and the resistance against counterfeiting and illegal reproduction of said security document, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents, the substrate may comprise one or more marker substances or taggants and/or machine readable substances (e.g. luminescent substances, UV/visible/IR absorbing substances, magnetic substances and combinations thereof).

FIG. 2A to 5A schematically illustrate suitable magnetic assemblies (x00) to be used during the process described herein. The magnetic assemblies (x00) described herein are suitable for the production and allows the production of OELs on the substrate described herein providing an optical impression of an ortho-parallactic effect, wherein said magnetic assemblies (x00) are used for orienting the non-spherical oblate magnetic or magnetizable pigment particles so as to produce the OEL described herein. The magnetic assemblies (x00) described herein are based on the interaction of at least a) the first magnetic-field generating device (x30) described herein and b) the second magnetic-field generating device (x40) described herein, which have mutually skew magnetic axes. The magnetic assembly (x00) described herein comprises or consists of the first magnetic-field generating device (x30) described herein and the second magnetic-field generating device (x40) described herein; wherein the first magnetic-field generating device (x30) described herein comprises or consists of the n sets of spaced apart bar dipole magnets (x31) described herein and wherein the second magnetic-field generating device (x40) comprises or consists of the one or more square-shaped or rectangle-shaped dipole magnets (x41) described herein.

The first magnetic-field generating device (x30) described herein comprises n (n=1, 2, 3, etc.) sets of spaced apart bar dipole magnets (x31), wherein each of said bar dipole magnets (x31) has its North-South magnetic axis substantially parallel to the substrate (x20) surface; wherein, for each set of said n sets, the bar dipole magnets (x31) have their North pole pointing in a same direction and are substantially parallel to each other; and wherein the bar dipole magnets (x31) of the first magnetic-field generating device (x30) are at least partially or fully embedded in the polygonal-shaped supporting matrix (x32) described herein.

By spaced apart, it is meant that, for each set of the n sets, the bar dipole magnets (x31) are not in direct contact and are separated by a distance being different from zero and being defined as the dimension of the line segment joining two bar dipole magnets (x31) at a 90° angle. In other words, the distance between two bar dipole magnets (x31) is equal to the distance between the two parallels along which said bar dipole magnets (x31) are aligned. Preferably, for each set of the n sets, the bar dipole magnets (x31), are not in direct contact and are separated by a distance correspond to at least 1, more preferably at least 2, still more preferably at least 4, average thickness(es) of said bar dipole magnets (x31). For embodiments wherein more than two bar dipole magnets (x31) are used in one or more sets of the n sets, each distance between said magnets corresponds to at least 1, more preferably at least 2, still more preferably at least 4, average thickness(es) of said bar dipole magnets (x31).

As described herein, the one or more polygonal-shaped supporting matrixes (x32) described herein are used for holding the spaced apart bar dipole magnets (x31) of the first magnetic-field generating device (x30) described herein together. The one or more polygonal-shaped supporting matrixes (x32) described herein may have the shape of a regular polygon (with or without rounded corners) or of an irregular polygon (with or without rounded corners). According to one embodiment, the one or more polygonal-shaped supporting matrixes (x32) described herein independently are square-shaped or rectangle-shaped.

The one or more supporting matrixes (x32) described herein are independently made of one or more non-magnetic materials. The non-magnetic materials are preferably selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetheretherketone), POM (polyoxymethylene), PTFE (polytetrafluoroethylene), Nylon® (polyamide) and PPS. The one or more polygonal-shaped, in particular the one or more square-shaped or rectangle-shaped, supporting matrixes (x32) described herein independently comprise one or more recesses, voids, indentations and/or spaces for holding the bar dipole magnets (x31) of the first magnetic-field generating device (x30) described herein.

For each set of the n sets, the spaced apart bar dipole magnets (x31) of the first magnetic-field generating device (x30) described herein may have the same shape and/or the same dimensions and/or may be made of the same material. Preferably, for each set of the n sets, the spaced apart bar dipole magnets (x31) of the first magnetic-field generating device (x30) described herein have the same shape, the same dimensions and are made of the same material. For embodiments wherein, for each set of the n sets, the spaced apart bar dipole magnets (x31) of the first magnetic-field generating device (x30) described herein have the same shape, the same dimensions and are made of the same material, the distance between said spaced apart bar dipole magnets (x31) may be expressed as a multiple M of the bar dipole magnet thickness, wherein said thickness is defined as the dimension of the bar dipole magnet (x31) being perpendicular to the parallels along which each bar dipole magnet (x31) in a set is aligned and, at the same time, being parallel to the substrate (x10) surface. Preferably, the multiple M is between about 1 and about 30, more preferably between about 2 and about 20 and still more preferably between about 4 and about 15.

The magnetic assembly (x00) described herein may further comprise one or more pieces (x50), wherein said one or more pole pieces (x50) are preferably placed below the first magnetic-field generating device (x30) and below the second magnetic-field generating device (x40) described herein. The one or more pieces (x50) described herein may be in direct contact with the first and second magnetic-field generating device (x30, x40) or may be separated from the first and second magnetic-field generating device (x30, x40). A pole piece denotes a structure composed of a material having high magnetic permeability, preferably a permeability between about 2 and about 1,000,000 $N \cdot A^{-2}$ (Newton per square Ampere), more preferably between about 5 and about 50,000 $N \cdot A^{-2}$ and still more preferably between about 10 and about 10,000 $N \cdot A^{-2}$. Pole piece serve to direct the magnetic field produced by magnets. The one or more pole pieces (x50) described herein may be made from iron or from a plastic material in which magnetizable particles are dispersed. Preferably the one or more pole piece (x50) described herein is made of iron. Preferably, the one or more pole pieces (x50) are independently square-shaped or rectangle-shaped pole pieces (x50).

Figure 2A:
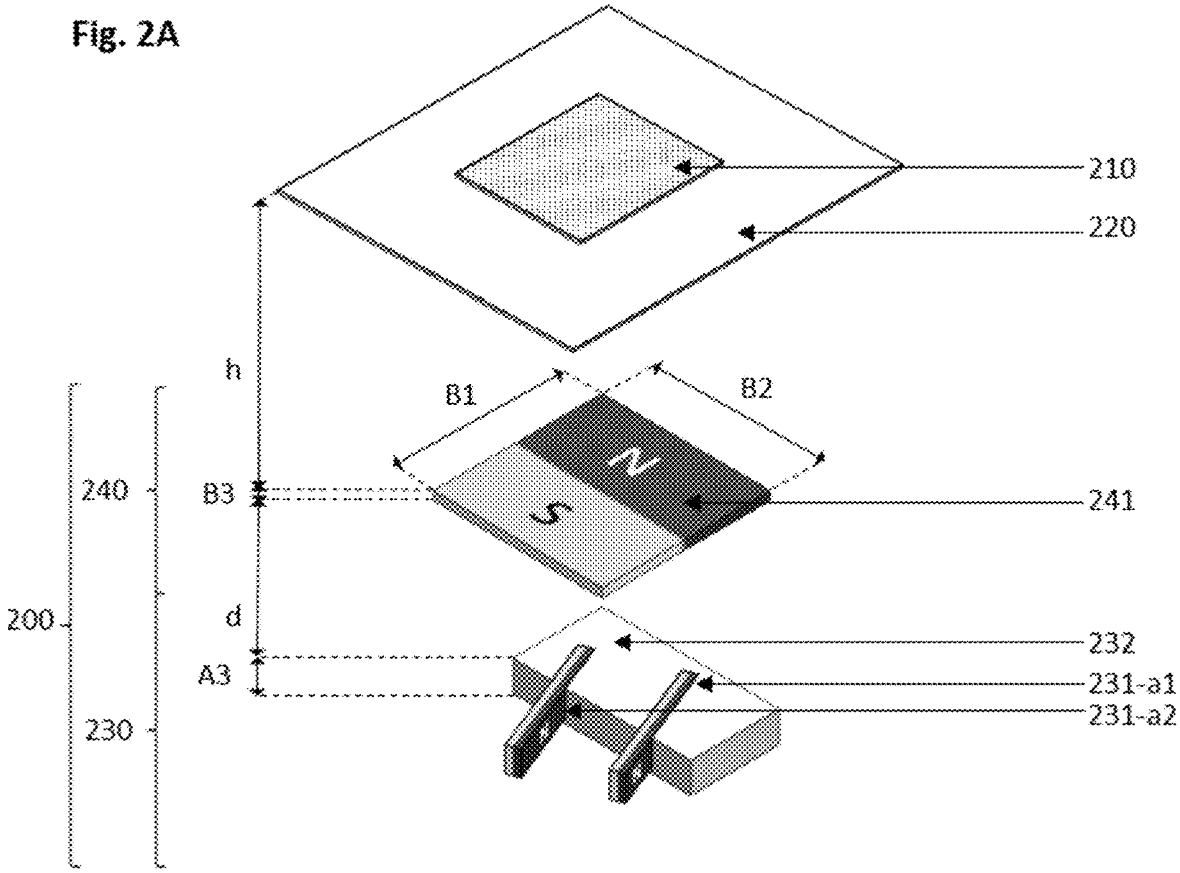
FIG. 2A-C schematically illustrates a magnetic assembly (200) for producing an optical effect layer (OEL) on a substrate (220) surface, wherein said magnetic assembly (200) comprises a first magnetic-field generating device (230) comprising one set of two spaced apart bar dipole magnets (231-*a*1, 231-*a*2) and a second magnetic-field generating device (240) comprising a square-shaped dipole magnet (241), wherein the first magnetic-field generating device (230) is placed below the second magnetic-field generating device (240) and the two are essentially centered with respect to one another. The two bar dipole magnets (231-*a*1, 231-*a*2) have a magnetic axis substantially parallel to the substrate (220) surface, are substantially parallel to each other and are embedded in a square-shaped supporting matrix (232).
Figure 3A:
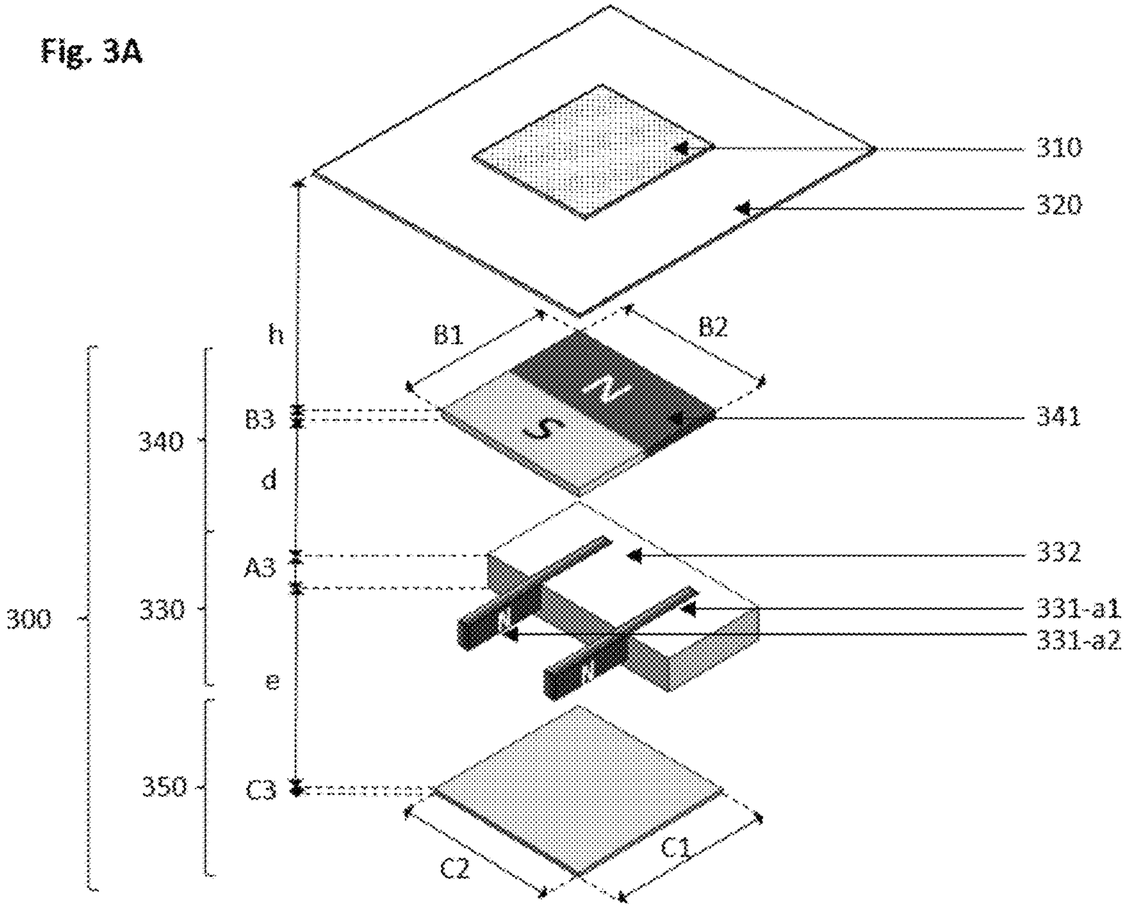
FIG. 3A-C schematically illustrates a magnetic assembly (300) for producing an optical effect layer (OEL) on a substrate (320) surface, wherein said magnetic assembly (300) comprises a first magnetic-field generating device (330) comprising one set of two spaced apart bar dipole magnets (331-*a*1, 331-*a*2), a second magnetic-field generating device (340) comprising a square-shaped dipole magnet (341) and a square-shaped pole piece (350), wherein the first magnetic-field generating device (330) is placed below the second magnetic-field generating device (340), wherein the square-shaped pole piece (350) is placed below the first magnetic-field generating device (330) and wherein said first magnetic-field generating device (330), said second magnetic-field generating device (340) and said square-shaped pole piece (350) are essentially centered with respect to one another. The two bar dipole magnets (331-*a*1, 331-*a*2) have a magnetic axis substantially parallel to the substrate (320) surface, are substantially parallel to each other and are embedded in a square-shaped supporting matrix (332).

According to one embodiment for example illustrated in FIGS. 2A and 3A, the first magnetic-field generating device (x30) described herein comprises one (n=1) set of spaced apart bar dipole magnets (x31), preferably one set of two or more spaced apart bar dipole magnets (x31), more preferably one set of two spaced apart bar dipole magnets (x31), wherein each of said bar dipole magnets (x31) has its North-South magnetic axis substantially parallel to the substrate (x20) surface, wherein all of said bar dipole magnets have their North pole pointing in a same direction and are substantially parallel to each other, and wherein said bar dipole magnets of the one set are at least partially or fully embedded in the polygonal-shaped, in particular the square-shaped or rectangle-shaped, supporting matrix (x32) described herein, more preferably in the square-shaped supporting matrix (x32) described herein. The bar dipole magnets (x31) of the one set may have the same shape, may have the same dimensions and may be made of the same material. According to one embodiment, the first magnetic-field generating device (x30) described herein comprises one (n=1) set of spaced apart bar dipole magnets (x31), preferably one set of two spaced apart bar dipole magnets (x31), wherein all the bar dipole magnets (x31) have the same shape, the same dimensions and are made of the same material.

For embodiments of magnetic assemblies (x00) comprising the first magnetic-field generating device (x30) comprising one (n=1) set of spaced apart bar dipole magnets (x31), preferably one set of two or more, more preferably two, spaced apart bar dipole magnets (x31) described herein, said magnetic assemblies (x00) may further comprise the one or more pole pieces (x50) described herein, preferably one or more square-shaped or rectangle-shaped pole pieces (x50), wherein said one or more pole pieces (x50) are placed below the first magnetic-field generating device (x30) and below the second magnetic-field generating device (x40) described herein.

According to another embodiment, the first magnetic-field generating device (x30) described herein comprises two or more (n=2, 3, 4, etc.) sets of spaced apart bar dipole magnets (x31), preferably two or more sets of two or more spaced apart bar dipole magnets (x31), more preferably two or more sets of two spaced apart bar dipole magnets (x31), wherein each of said bar dipole magnets (x31) has its North-South magnetic axis substantially parallel to the substrate (x20) surface; wherein, for each set of said two or more sets, the bar dipole magnets have their North pole pointing in a same direction and are substantially parallel to each other; and wherein said bar dipole magnets of the two or more sets are at least partially or fully embedded in the polygonal-shaped, in particular the square-shaped or rectangle-shaped, supporting matrix (x32) described herein. Preferably, the two or more sets of spaced apart bar dipole magnets (x31), preferably two or more sets of two or more spaced apart bar dipole magnets (x31), more preferably two or more sets of two spaced apart bar dipole magnets (x31), are arranged in a loop-shaped form, preferably a square-shaped form, a rectangle-shaped form or a diamond-shaped form, more preferably a square-shaped form or a diamond-shaped form, wherein, for each set of the n sets, the bar dipole magnets (x31) may have the same shape, may have the same dimensions and may be made of the same material, preferably have the same shape, have the same dimensions and are made of the same material. According to one embodiment, the first magnetic-field generating device (x30) described herein comprises two or more (n=2, 3, 4, etc.) sets of two or more (i.e. 2, 3, 4 etc.) spaced apart bar dipole magnets (x31), preferably two or more sets of two spaced apart bar dipole magnets (x31), wherein for each set of the n sets, the bar dipole magnets (x31) have the same shape, the same dimensions and are made of the same material.

The loop-shaped form described herein may be continuous or discontinuous. By "continuous loop-shaped form", it is meant that the bar dipole magnets (x31) of the different sets are in direct contact thus forming the loop-shaped form and by "discontinuous loop-shaped form", it is meant that at least some of the bar dipole magnets (x31) of the different sets are not in direct contact and the so-obtained loop-shaped form comprise some holes, intervals or gaps between said magnets.

Figure 4A:
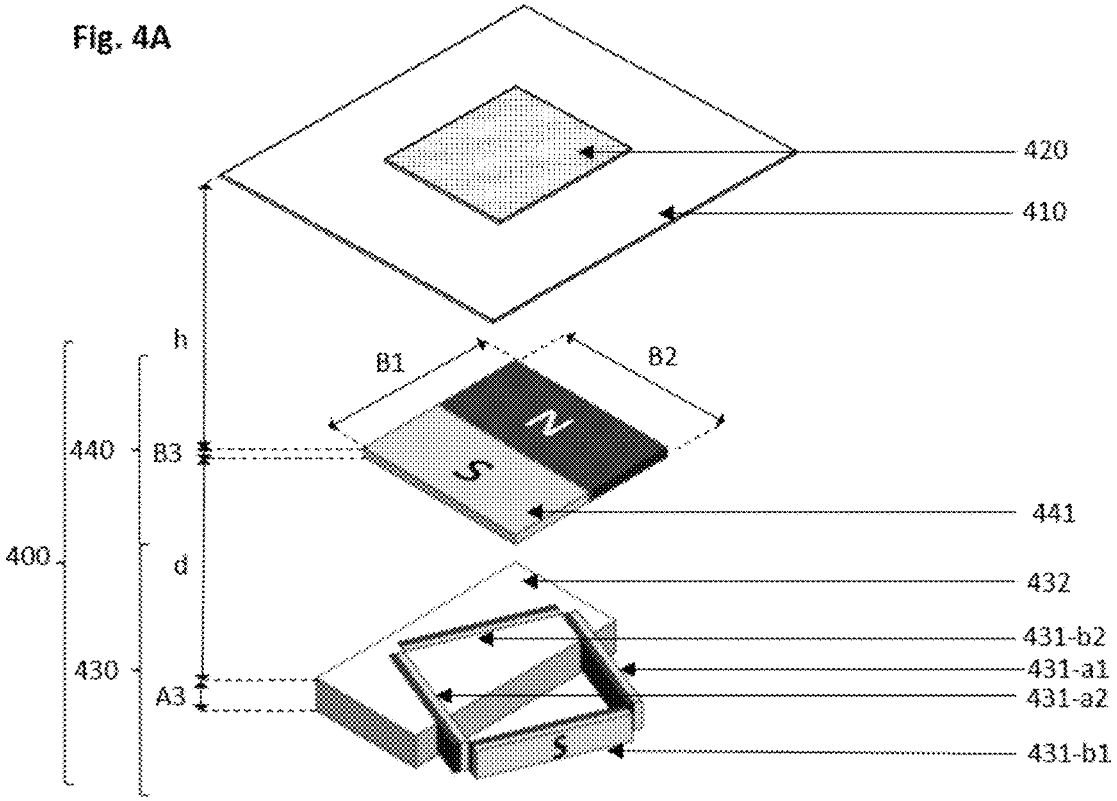
FIG. 4A-C schematically illustrates a magnetic assembly (400) for producing an optical effect layer (OEL) on a substrate (420) surface, wherein said magnetic assembly (400) comprises a first magnetic-field generating device (430) comprising two sets of two spaced apart bar dipole magnets (first set: 431-*a*1 and 431-*a*2; second set 431-*b*1 and 431-*b*2) and a second magnetic-field generating device (440) comprising a square-shaped dipole magnet (441), wherein the first magnetic-field generating device (430) is placed below the second magnetic-field generating device (440) and the two are essentially centered with respect to one another. The four bar dipole magnets (431-*a*1, 431-*a*2, 431-*b*1, 431-*b*2) have a magnetic axis substantially parallel to the substrate (420), are embedded in a square-shaped supporting matrix (432) and are arranged in a square-shaped form. The two bar dipole magnets (431-*a*1, 431-*a*2) of the first set are substantially parallel to each other and the two bar dipole magnets (431-*b*1, 431-*b*2) of the second set are substantially parallel to each other.
Figure 5A:
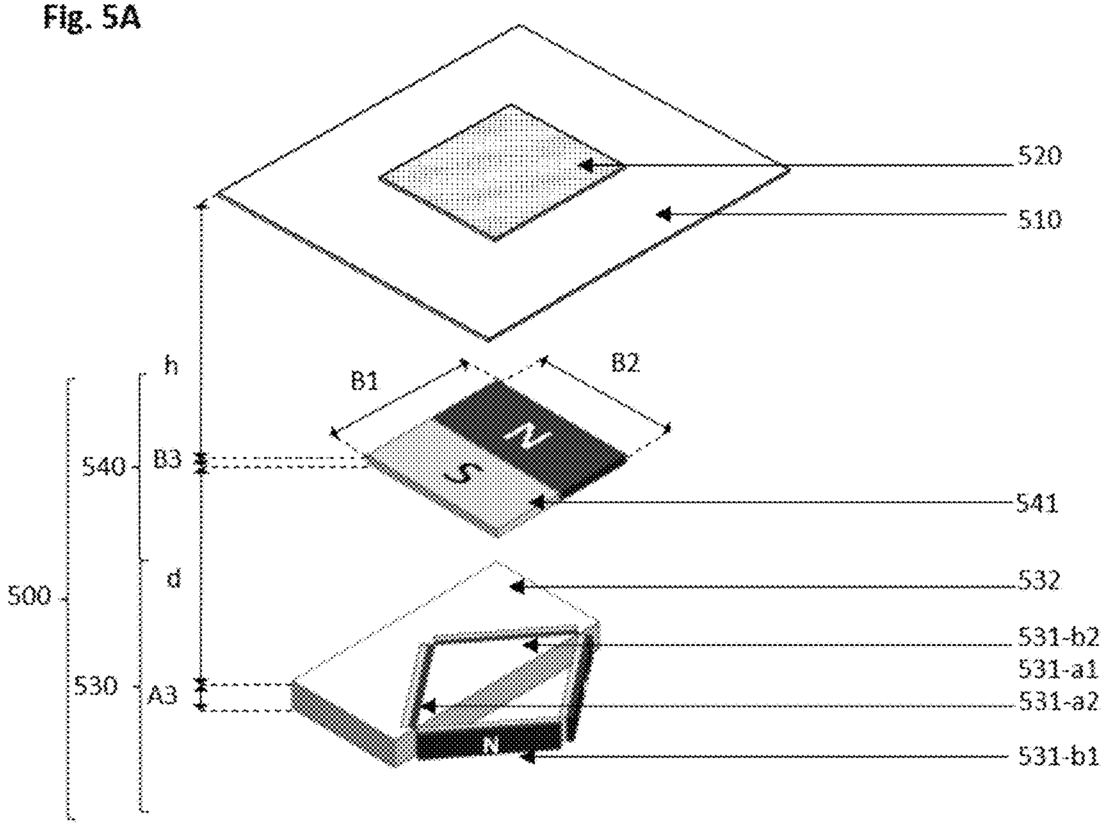
FIG. 5A-C schematically illustrates a magnetic assembly (500) for producing an optical effect layer (OEL) on a substrate (520) surface, wherein said magnetic assembly (500) comprises a first magnetic-field generating device (530) comprising two sets of two spaced apart bar dipole magnets (first set: 531-*a*1 and 531-*a*2; second set 531-*b*1 and 531-*b*2) and a second magnetic-field generating device (540) comprising a square-shaped dipole magnet (541), wherein the first magnetic-field generating device (530) is wherein the first magnetic-field generating device (530) is placed below the second magnetic-field generating device (540) and the two are essentially centered with respect to one another. The four bar dipole magnets (531-*a*1, 531-*a*2, 531-*b*1, 531-*b*2) have a magnetic axis substantially parallel to the substrate (520), are embedded in a square-shaped supporting matrix (532) and are arranged in a diamond-shaped form. The two bar dipole magnets (531-*a*1, 531-*a*2) of the first set are substantially parallel to each other and the two bar dipole magnets (531-*b*1, 531-*b*2) of the second set are substantially parallel to each other.

According to another embodiment for example illustrated in FIGS. 4A and 5A, the first magnetic-field generating device (x30) described herein comprises two or more (n=2, 3, 4, etc.) sets of spaced apart bar dipole magnets (x31), preferably two sets of two or more spaced apart bar dipole magnets (x31), more preferably two sets of two spaced apart bar dipole magnets (x31), wherein each of said bar dipole magnets (x31) has its North-South magnetic axis substantially parallel to the substrate (x20) surface; wherein for each set of said two or more sets, the bar dipole magnets have their North pole pointing in a same direction and are substantially parallel to each other, and wherein said bar dipole magnets (x31) of the two or more sets are at least partially or fully embedded in the polygonal-shaped, in particular the square-shaped or rectangle-shaped, supporting matrix (x32) described herein, more preferably in the square-shaped supporting matrix (x32) described herein. Preferably, the two sets of spaced apart bar dipole magnets (x31), more preferably two sets of two or more spaced apart bar dipole magnets (x31), more preferably two sets of two spaced apart bar dipole magnets (x31), are arranged in a loop-shaped form, preferably a square-shaped form or a diamond-shaped form, wherein, for each set of the two or more sets, the bar dipole magnets (x31) may have the same shape, may have the same dimensions and may be made of the same material, preferably have the same shape, the same dimensions and are made of the same material.

For embodiments of magnetic assemblies (x00) comprising the first magnetic-field generating device (x30) comprising two or more (n=2, 3, 4, etc.) sets of spaced apart bar dipole magnets (x31), preferably two sets of two or more, more preferably two or four, still more preferably two, spaced apart bar dipole magnets (x31) described herein, said magnetic assemblies (x00) may further comprise the one or more pole pieces (x50) described herein, preferably one or more square-shaped or rectangle-shaped pole pieces (x50), wherein said one or more pole pieces (x50) are placed below the first magnetic-field generating device (x30) and below the second magnetic-field generating device (x40) described herein.

The second magnetic-field generating device (x40) described herein comprises one or more square-shaped or rectangle-shaped dipole magnets (x41) having its North-South magnetic axis substantially parallel to the substrate (x20) surface. When the second magnetic-field generating device (x40) described herein comprises more than one, i.e. two or more, square-shaped or rectangle-shaped dipole magnets (x41), said dipole magnets (x41) have their North-South magnetic axis substantially parallel to the substrate (x20) surface and have the same magnetic direction.

The first magnetic-field generating device (x30) described herein may be disposed on top of the second magnetic-field generating device (x40) described herein or may be disposed below the first magnetic-field generating device (x30) described herein. Preferably, and as shown in FIG. 2A-5A, the first magnetic-field generating device (x30) described herein is disposed below the second magnetic-field generating device (x40) described herein; in other words, during the process to produce the optical effect layer (OEL) described herein, the substrate (x20) carrying the coating layer (x10) comprising the non-spherical oblate magnetic or magnetizable pigment particles is disposed on top of the second magnetic-field generating device (x40) and said second magnetic-field generating device (x40) is disposed on top of the first magnetic-field generating device (x30). According to one embodiment, during the process to produce the OEL described herein, the substrate (x20) carrying the coating layer (x10) comprising the non-spherical oblate magnetic or magnetizable pigment particles is disposed on top of the second magnetic-field generating device (x40), said second magnetic-field generating device (x40) is disposed on top of the first magnetic-field generating device (x30) and said first magnetic-field generating device (x30) is disposed on top of the one or more pole pieces (x50).

The magnetic axis of the first magnetic field generating device (x30) and the magnetic axis of the second magnetic field generating device (x40) are substantially parallel to the substrate (x20) surface onto which said optical effect layer (OEL) is produced. The first magnetic-field generating device (x30) described herein comprising n (n=1, 2, 3, etc.) sets of bar dipole magnets (x31) has a vector sum H1 of the magnetic axes of said bar dipole magnets (x31) and the second magnetic-field generating device (x40) described herein comprising the one or more square-shaped or rectangle-shaped dipole magnets (x41) has a vector sum H2 of the magnetic axes of said one or more dipole magnets (x41), wherein the term "magnetic axis" denotes in the context of the present invention a unit vector connecting the magnetic centers of the North and South pole faces of a magnet and going from the South pole to the North pole (for clarity reasons, the magnetic axis is shown in FIG. 2D-5D as pointing from the North pole). The first magnetic-field generating device (x30) and the second magnetic-field generating device (x40) described herein are stacked, preferably coaxially arranged. The bar dipole magnets (x31) of the first magnetic-field generating device (x30) and their magnetic axis are arranged in such a way that the vector sum H1 of the magnetic axes of said bar dipole magnets (x31) of said first magnetic-field generating device (x30) and the vector sum H2 of the one or more square-shaped or rectangle-shaped dipole magnets (x41) form an angle α in the range from about 5° to about 175° or in the range from about 185° to about 355°, preferably in the range from about 60° to about 120° or in the range from about 240° to about 300°.

The bar dipole magnets (x31) of the first magnetic-field generating device (x30) and the square-shaped or rectangle-shaped dipole magnets (x41) of the second magnetic-field generating device (x40) are preferably independently made of high-coercivity materials (also referred as strong magnetic materials). Suitable high-coercivity materials are materials having a maximum value of energy product $(BH)_{max}$ of at least 20 kJ/m$^3$, preferably at least 50 kJ/m$^3$, more preferably at least 100 kJ/m$^3$, even more preferably at least 200 kJ/m$^3$. They are preferably made of one or more sintered or polymer bonded magnetic materials selected from the group consisting of Alnicos such as for example Alnico 5 (R1-1-1), Alnico 5 DG (R1-1-2), Alnico 5-7 (R1-1-3), Alnico 6 (R1-1-4), Alnico 8 (R1-1-5), Alnico 8 HC (R1-1-7) and Alnico 9 (R1-1-6); hexaferrites of formula $MFe_{12}O_{19}$, (e.g. strontium hexaferrite ($SrO*6Fe_2O_3$) or barium hexaferrites ($BaO*6Fe_2O_3$)), hard ferrites of the formula $MFe_2O_4$ (e.g. as cobalt ferrite ($CoFe_2O_4$) or magnetite ($Fe_3O_4$)), wherein M is a bivalent metal ion), ceramic 8 (SI-1-5); rare earth magnetic materials selected from the group comprising $RECo_5$ (with RE=Sm or Pr), $RE_2TM_{17}$ (with RE=Sm, TM=Fe, Cu, Co, Zr, Hf), $RE_2TM_{14}B$ (with RE=Nd, Pr, Dy, TM=Fe, Co); anisotropic alloys of Fe Cr Co; materials selected from the group of PtCo, MnAlC, RE Cobalt 5/16, RE Cobalt 14. Preferably, the high-coercivity materials of the magnet bars are selected from the groups consisting of rare earth magnetic materials, and more preferably from the group consisting of $Nd_2Fe_{14}B$ and $SmCo_5$. Particularly preferred are easily workable permanent-magnetic composite materials that comprise a permanent-magnetic filler, such as strontium-hexaferrite ($SrFe_{12}O_{19}$) or neodymium-iron-boron ($Nd_2Fe_{14}B$) powder, in a plastic- or rubber-type matrix.

The magnetic assembly (x00) described herein may further comprise a magnetized plate (x60) comprising one or more surface reliefs, engravings and/or cut-outs representing one or more indicia, wherein said magnetized plate is disposed between the substrate (x20) and the magnetic-field generating device (x30, x40) thus facing the substrate (x20) (see FIG. 6A). As used herein, the term "indicia" shall mean designs and patterns, including without limitation symbols, alphanumeric symbols, motifs, letters, words, numbers, logos and drawings. The one or more surface reliefs, engravings and/or cut-outs of the magnetized plate (x60) bear the indicia that are transferred to the OEL in its non-cured state by locally modifying the magnetic field generated by the magnetic assembly (x00) described herein. Suitable examples of magnetized plates (x60) comprising the one or more surface reliefs, engravings and/or cut-outs described herein for the present invention can be found in in WO 2005/002866 A1, WO 2008/046702 A1, WO 2008/139373 A1, WO 2018/019594 A1 and WO 2018/033512 A1.

The magnetized plate (x60) comprising one or more engravings and/or cut-outs described herein may be made from any mechanically workable permanent-magnetic material, such as permanent-magnetic composite materials, comprising a permanent magnetic powder in a malleable metal- or polymer matrix. Preferably, the magnetized plate (x60) described herein is a polymer-bonded plate of magnetic material, i.e. a magnetized plate (x60) made of a composite material comprising a polymer. The polymer (e.g. rubber- or plastic-like polymer) acts as a structural binder and the permanent magnetic powder material acts as an extender or filler. Magnetized plates made of a composite material comprising a polymer and a permanent magnetic powder material advantageously combine the desirable magnetic properties (high coercivity) of the otherwise brittle and not well workable ferrite, Alnico, rare-earth or still other magnets with the desirable mechanical properties (flexibility, machine-ability, shock-resistance) of a malleable metal or a plastic material. Preferred polymers include rubber-type flexible materials such as nitrile rubbers, EPDM hydrocarbon rubbers, poly-isoprenes, polyam ides (PA), poly-phenylene sulfides (PPS), and chlorosulfonated polyethylenes.

Preferred permanent magnetic powder materials include cobalt, iron and their alloys, chromium dioxide, generic magnetic oxide spinels, generic magnetic garnets, generic magnetic ferrites including the hexaferrites such as calcium-, strontium-, and barium-hexaferrite (CaFe12019, SrFe12019, BaFe12019, respectively), generic alnico alloys, generic samarium-cobalt (SmCo) alloys, and generic rare-earth-iron-boron alloys (such as NdFeB), as well as the permanent-magnetic chemical derivatives thereof (such as indicated by the term generic) and mixtures thereof. Plates made of a composite material comprising a polymer and a permanent magnetic powder are obtainable from many different sources, such as from Group ARNOLD (Plastiform®) or from Materiali Magnetici, Albairate, Milano, IT (Plastoferrite).

The magnetized plate (x60) described herein, in particular the magnetized plate (x60) made of the composite material comprising the polymer and the permanent magnetic powder material described herein, can be obtained in any desired size and form, e.g. as a thin, flexible plates which can be bent and mechanically worked, e.g. cut to size or shape, using commonly available mechanical ablation tools and machines, as well as air or liquid jet ablation, or laser ablation tools.

The one or more surface engravings and/or cut-outs of the magnetized plate (x60) described herein, in particular the magnetized plate (x60) made of the composite material comprising the polymer and the permanent magnetic powder material described herein, may be produced by any cutting, engraving or forming methods known in the art including without limitation casting, molding, hand-engraving or ablation tools selected from the group consisting of mechanical ablation tools (including computer-controlled engraving tools), gaseous or liquid jet ablation tools, by chemical etching, electro-chemical etching and laser ablation tools (e.g. $CO^{2-}$, Nd-YAG or excimer lasers). As is understood by the person skilled in the art and described herein, the magnetized plate (x60) described herein, in particular the magnetized plate (x60) made of the composite material comprising the polymer and the permanent magnetic powder material described herein, can also be cut or molded to a particular size and shape, rather than engraved. Holes may be cut out of it, or cut-out pieces may be assembled on a support.

The one or more engravings and cut-outs of the magnetized plate (x60), in particular the magnetized plate (x60) made of the composite material comprising the polymer and the permanent magnetic powder material described herein, may be filled up with a polymer, which may contain fillers. Said filler may be a soft magnetic material, for modifying the magnetic flux at the locations of the one or more engravings/cut-outs, or it may be any other type of magnetic or non-magnetic material, in order to modify the magnetic field properties, or to simply produce a smooth surface. The magnetized plate (x60), in particular the magnetized plate (x60) made of the composite material comprising the polymer and the permanent magnetic powder material described herein, may additionally be surface-treated for facilitating the contact with the substrate, reducing friction and/or wear and/or electrostatic charging in a high-speed printing application.

Preferably, the magnetized plate (x60) described herein is made of the composite material comprising the polymer and the permanent magnetic powder material described herein, preferably made of plastoferrite, and comprises one or more engravings. The plastoferrite plate is engraved with a desired high resolution pattern having the form of indicia, either using a mechanical engraving tool, or, preferably, using an automated $CO^{2-}$, Nd-YAG-laser engraving tool.

The magnetized plate (x60) described herein made of the composite material comprising the polymer and the permanent magnetic powder material described herein, preferably made of plastoferrite, may be provided as a pre-formed plate and the one or more engravings and/or surface irregularities representing the indicia are subsequently prepared in accordance with the specific requirements of use.

The distance (d) between the first magnetic-field generating device (x30) described herein and the second magnetic-field generating device (x40) described herein is preferably between about 0 and about 10 mm, more preferably between about 0 mm and about 5 mm and still more preferably 0.

The distance (h) between the uppermost surface of the first magnetic-field generating device (x30) or the second magnetic-field generating device (x40) described herein and the lower surface of the substrate (x20) facing either the first magnetic-field generating device (x30) or the second magnetic-field generating device (x40) is preferably between about 0.5 mm and about 10 mm, more preferably between about 0.5 mm and about 7 mm and still more preferably between about 1 mm and 7 mm.

The distance (e) between the first magnetic-field generating device (x30) or the second magnetic-field generating device (x40) and the one or more pole pieces (x50) described herein is independently preferably between about 0 and about 5 mm, more preferably between about 0 mm and about 2 mm.

The materials of the bar dipole magnets (x31) of the first magnetic-field generating device (x30), of the square-shaped or rectangle-shaped dipole magnets (x41) of the second magnetic-field generating device (x40), of the one or more pole pieces (x50) when present, and the distances (d), (h), and (e) are selected such that the magnetic field resulting from the interaction of the first magnetic-field generating device (x30), of the second magnetic-field generating device (x40) and of the one or more pole pieces (x50), when present, is suitable for producing the optical effects layers (OELs) described herein, i.e. said resulting magnetic field is able to orient non-spherical oblate magnetic or magnetizable pigment particles in an as yet uncured radiation curable coating composition on the substrate (x20), which are disposed in the magnetic field of the magnetic assembly (x00) to produce an optical impression of an ortho-parallactic effect.

FIG. 2A-D illustrates an example of a magnetic assembly (200) suitable for producing optical effect layers (OELs) comprising non-spherical oblate magnetic or magnetizable pigment particles on a substrate (220) according to the present invention. The magnetic assembly (200) comprises a first magnetic-field generating device (230) comprising one set of two spaced apart bar dipole magnets (231-*a*1, 231-*a*2) and a second magnetic-field generating device (240) comprising a square-shaped dipole magnet (241).

Figure 2B:
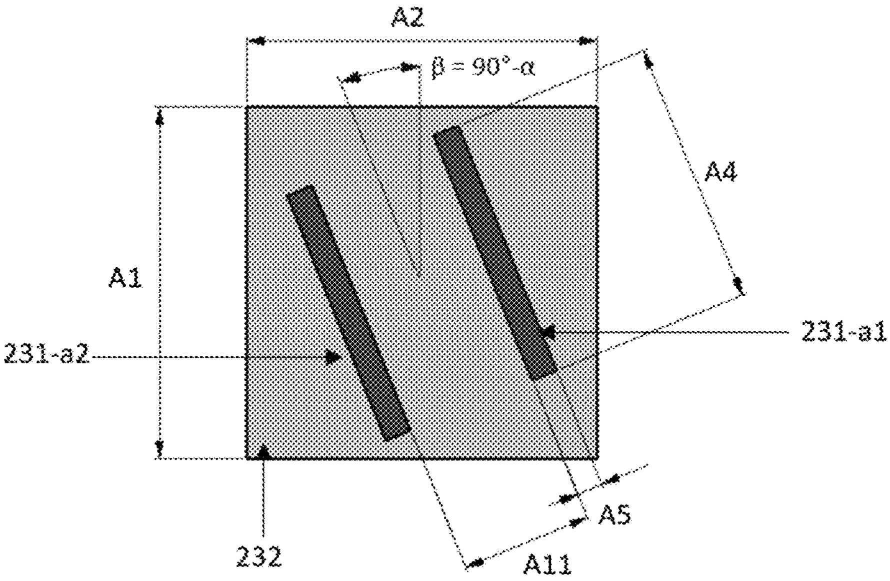

As shown in FIG. 2A-B, the two bar dipole magnets (231-*a*1, 231-*a*2) of the first magnetic-field generating device (230) have a magnetic axis substantially parallel to the substrate (220) surface, are substantially parallel to each other and are embedded in a square-shaped supporting matrix (232). The two bar dipole magnets (231-*a*1, 231-*a*2) preferably have the same shape, the same dimensions and are made of the same material.

The square-shaped dipole magnet (241) of the second magnetic-field generating device (240) is placed on top of the two bar dipole magnets (231-*a*1, 231-*a*2) of the first magnetic-field generating device (230); i.e. the square-shaped dipole magnet (241) is placed between the two bar dipole magnets (231-*a*1, 231-*a*2) and the substrate (220).

As shown in FIG. 2A-D, the two bar dipole magnets (231-*a*1, 231-*a*2) are disposed in such a way that the vector sum H1 of the magnetic axes ($h_{231\text{-}a1}$, $h_{231\text{-}a2}$) of said two bar dipole magnets (231-*a*1, 231-*a*2) makes an angle α between 5° and about 175°, preferably between 60° and about 120°, in particular 68°, with the magnetic axis H2 of the square-shaped dipole magnet (241).

The distance (d) between the lower surface of the square-shaped dipole magnet (241) and the upper surface of the two bar dipole magnets (231-*a*1, 231-*a*2) is preferably between about 0 and about 10 mm, more preferably between about 0 and about 5 mm and is still more preferably about 0, i.e. the square-shaped dipole magnet (241) and the two bar dipole magnets (231-*a*1, 231-*a*2) are in direct contact.

The distance (h) between the upper surface of the square-shaped dipole magnet (241) and the surface of the substrate (220) facing the magnetic assembly (200) is preferably between about 0.5 mm and about 10 mm, more preferably between about 0.5 mm and about 7 mm and still more preferably between about 1 mm and 7 mm.

Figure 2C:
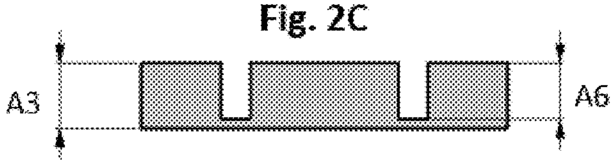
Figures 1, 2D:
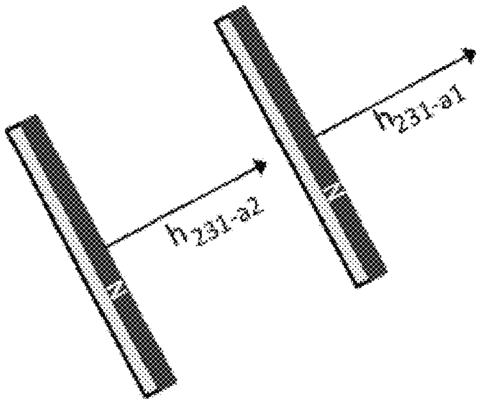
Figures 2, 2D, 3:
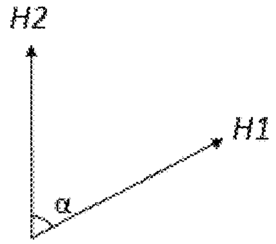
Figures 2, 2D:
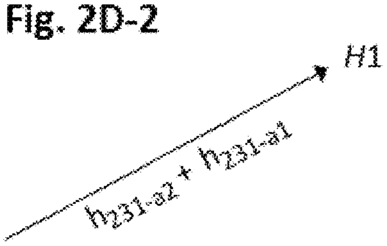
Figure 2E:
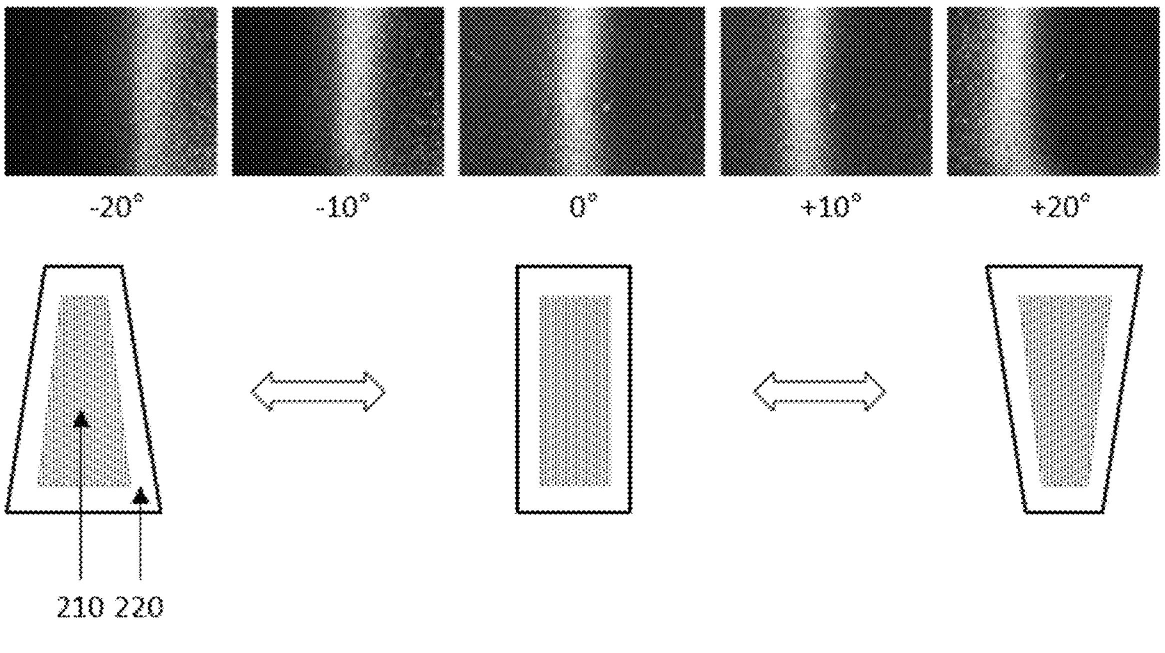
FIG. 2E shows pictures of an OEL obtained by using the magnetic assembly (200) illustrated in FIG. 2A-D, as seen from a fixed position as the sample is tilted from −20° to +20°.

The resulting OEL produced with the static magnetic assembly (200) illustrated in FIG. 2A-2C is shown in FIG. 2E at different viewing angles by tilting the substrate (220) between −20° and +20°. The so-obtained OEL provides the optical impression of a bright reflective vertical bar moving laterally upon tilting of the substrate (220).

FIG. 3A-D illustrates an example of a magnetic assembly (300) suitable for producing optical effect layers (OELs) comprising non-spherical oblate magnetic or magnetizable pigment particles on a substrate (320) according to the present invention. The magnetic assembly (300) comprises a first magnetic-field generating device (330) comprising one set of two spaced apart bar dipole magnets (331-*a*1, 331-*a*2), a second magnetic-field generating device (340) comprising a square-shaped dipole magnet (341) and a square-shaped pole piece (350).

Figure 3B:
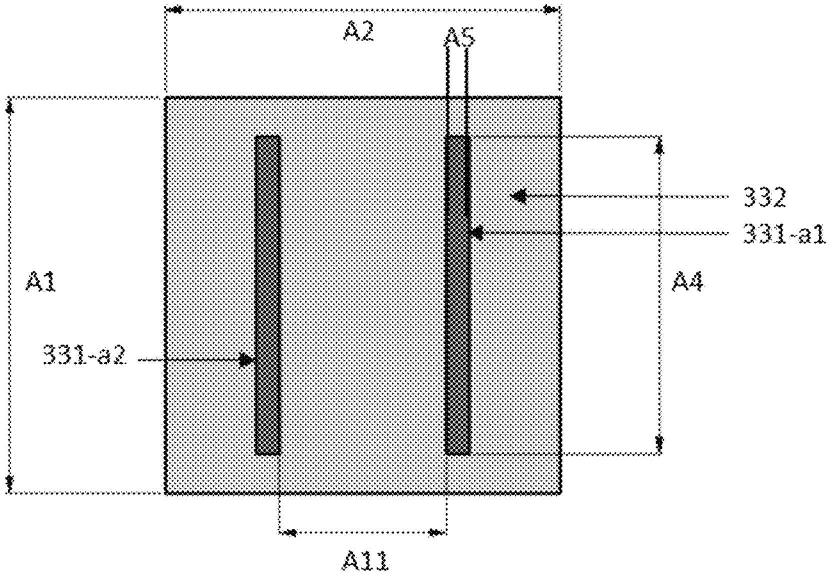
Figure 3C:
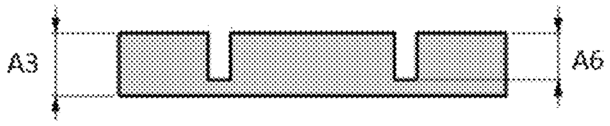
Figures 1, 3D:
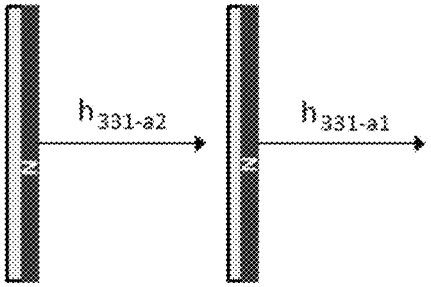
Figures 3, 3D:
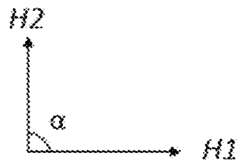
Figures 2, 3D:
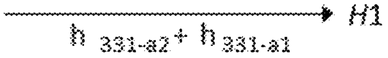

As shown in FIG. 3A-B, the two bar dipole magnets (331-*a*1, 331-*a*2) of the first magnetic-field generating device (330) have a magnetic axis substantially parallel to the substrate (320) surface, are substantially parallel to each other and are embedded in a square-shaped supporting matrix (332). The two bar dipole magnets (331-*a*1, 331-*a*2) preferably have the same shape, the same dimensions and are made of the same material.

The square-shaped dipole magnet (341) of the second magnetic-field generating device (340) is placed on top of the two bar dipole magnets (331-*a*1, 331-*a*2) of the first magnetic-field generating device (330); i.e. the square-shaped dipole magnet (341) is placed between the two bar dipole magnets (331-*a*1, 331-*a*2) and the substrate (320).

The two bar dipole magnets (331-*a*1, 331-*a*2) of the first magnetic-field generating device (330) are placed on top of the square-shaped pole piece (350), i.e. the two bar dipole magnets (331-*a*1, 331-*a*2) are placed between the square-shaped dipole magnet (341) and the square-shaped pole piece (350).

As shown in FIG. 3A-D, the two bar dipole magnets (331-*a*1, 331-*a*2) are disposed in such a way that the vector sum H1 of the magnetic axes ($h_{331\text{-}a1}$, $h_{331\text{-}a2}$) of said two bar dipole magnets (331-*a*1, 331-*a*2) makes an angle α between 5° and about 175°, preferably between 60° and about 120°, in particular 90°, with the magnetic axis H2 of the square-shaped dipole magnet (341).

The distance (d) between the lower surface of the square-shaped dipole magnet (341) and the upper surface of the two bar dipole magnets (331-*a*1, 331-*a*2) is preferably between about 0 and about 10 mm, more preferably between about 0 and about 5 mm and is still more preferably about 0, i.e. the square-shaped dipole magnet (341) and the two bar dipole magnets (331-*a*1, 331-*a*2) are in direct contact.

The distance (h) between the upper surface of the square-shaped dipole magnet (341) and the surface of the substrate (320) facing the magnetic assembly (300) is preferably between about 0.5 mm and about 10 mm, more preferably between about 0.5 mm and about 7 mm and still more preferably between about 1 mm and 7 mm.

The distance (e) between the lower surface of the two bar dipole magnets (331-*a*1, 331-*a*2) and the upper surface of the square-shaped pole piece (350) is preferably between about 0 and about 5 mm, more preferably between about 0 and about 2 mm.

Figure 3E:
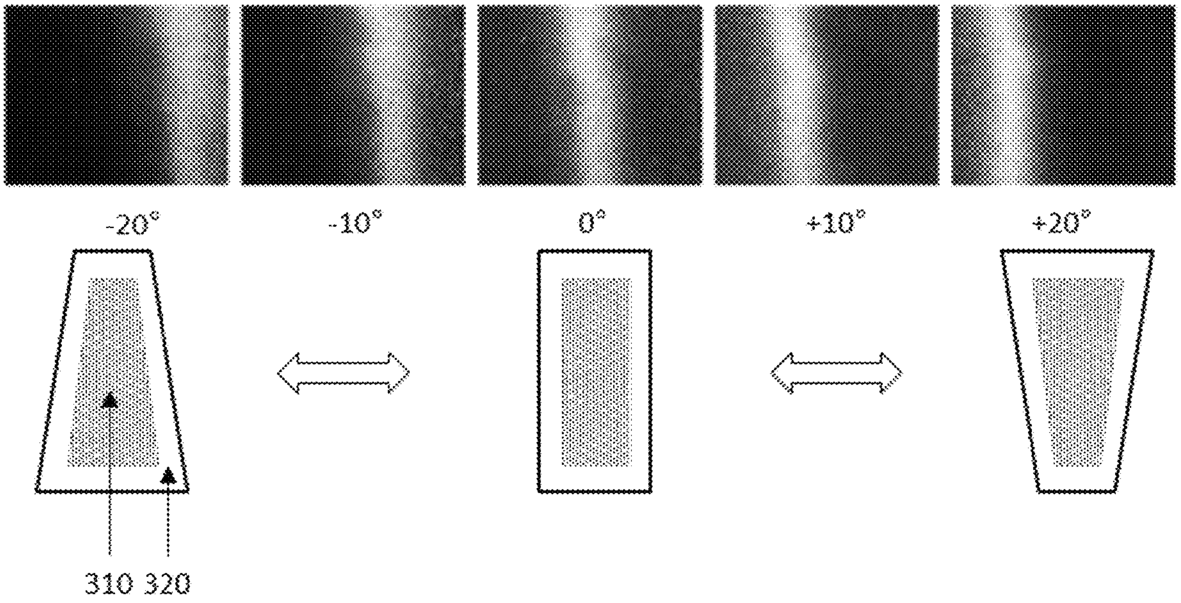
FIG. 3E shows pictures of an OEL obtained by using the magnetic assembly (300) illustrated in FIG. 3A-D, as seen from a fixed position as the sample is tilted from −20° to +20°.

The resulting OEL produced with the static magnetic assembly (300) illustrated in FIG. 3A-D is shown in FIG. 3E at different viewing angles by tilting the substrate (320) between −20° and +20°. The so-obtained OEL provides the optical impression of a bright reflective vertical bar moving laterally upon tilting of the substrate (320).

FIG. 4A-D illustrates an example of a magnetic assembly (400) suitable for producing optical effect layers (OELs) comprising non-spherical oblate magnetic or magnetizable pigment particles on a substrate (420) according to the present invention. The magnetic assembly (400) comprises a first magnetic-field generating device (430) comprising two sets of two, i.e. four, spaced apart bar dipole magnets (431-*a*1, 431-*a*2, 431-*b*1, 431-*b*2) and a second magnetic-field generating device (440) comprising a square-shaped dipole magnet (441).

As shown in 4A-B, the four bar dipole magnets (431-*a*1, 431-*a*2, 431-*b*1, 431-*b*2) of the first magnetic-field generating device (430) have a magnetic axis substantially parallel to the substrate (420) surface and are embedded in a square-shaped supporting matrix (432). For each set of the two sets, the two bar dipole magnets preferably have the same shape, the same dimensions and are made of the same material, in particular, the four bar dipole magnets (431-*a*1, 431-*a*2, 431-*b*1, 431-*b*2) preferably have the same shape, the same dimensions and are made of the same material.

Figure 4B:
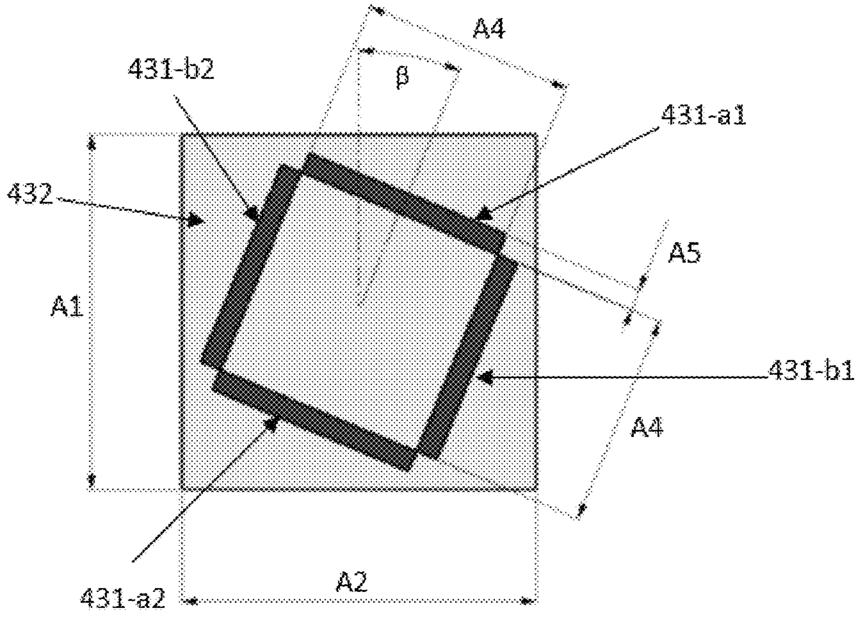
Figure 4C:
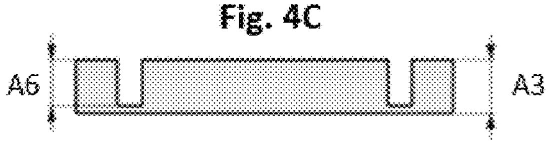
Figures 1, 4D:
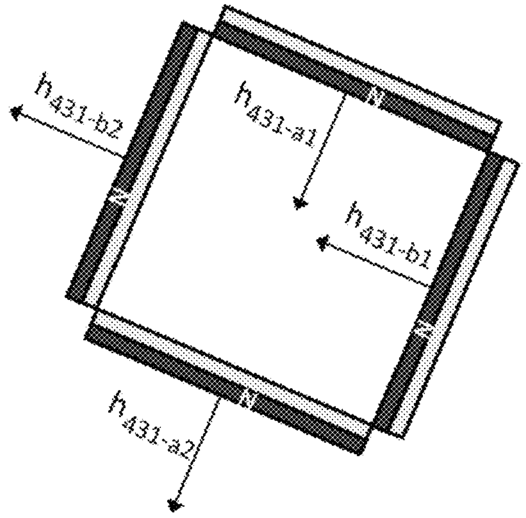
Figures 3, 4D:
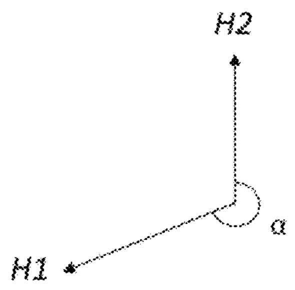
Figures 2, 4D:
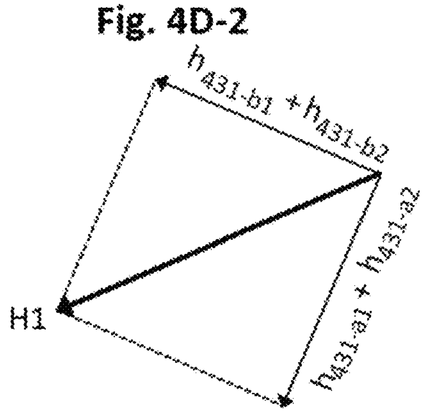

As shown in FIG. 4A-B, the first set (a) of the two sets comprises two bar dipole magnets (431-*a*1, 431-*a*2) that are substantially parallel to each other and that have their North pole pointing in a same first direction and the second set (b) of the two sets comprises two bar dipole magnets (431-*b*1, 431-*b*2) that are substantially parallel to each other and that have their North pole pointing in a same second direction. The four bar dipole magnets (431) are arranged in a loop-shaped form, in particular a square-shaped form.

The square-shaped dipole magnet (441) of the second magnetic-field generating device (440) is placed on top of the four bar dipole magnets (431-*a*1, 431-*a*2, 431-*b*1, 431-*b*2) of the first magnetic-field generating device (430); i.e.

the square-shaped dipole magnet (441) is placed between the four bar dipole magnets (431-*a*1, 431-*a*2, 431-*b*1, 431-*b*2) and the substrate (420).

As shown in FIG. 4A-D, the four bar dipole magnets (431-*a*1, 431-*a*2, 431-*b*1, 431-*b*2) are disposed in such a way that the vector sum H1 of the magnetic axes ($h_{431\text{-}a1}$, $h_{431\text{-}a2}$, $h_{431\text{-}b1}$, $h_{431\text{-}b2}$) of said four bar dipole magnets (431-*a*1, 431-*a*2, 431-*b*1, 431-*b*2) makes an angle between 185° and about 355°, preferably between 240° and about 300°, in particular 247.5°, with the magnetic axis H2 of the square-shaped dipole magnet (441).

The distance (d) between the lower surface of the square-shaped dipole magnet (441) and the upper surface of the four bar dipole magnets (431-*a*1, 431-*a*2, 431-*b*1, 431-*b*2) is preferably between about 0 and about 10 mm, more preferably between about 0 and about 5 mm and is still more preferably about 0, i.e. the square-shaped dipole magnet (441) and the four bar dipole magnets (431-*a*1, 431-*a*2, 431-*b*1, 431-*b*2) are in direct contact.

The distance (h) between the upper surface of the square-shaped dipole magnet (441) and the surface of the substrate (420) facing the magnetic assembly (400) is preferably between about 0.5 mm and about 10 mm, more preferably between about 0.5 mm and about 7 mm and still more preferably between about 1 mm and 7 mm.

Figure 4E:
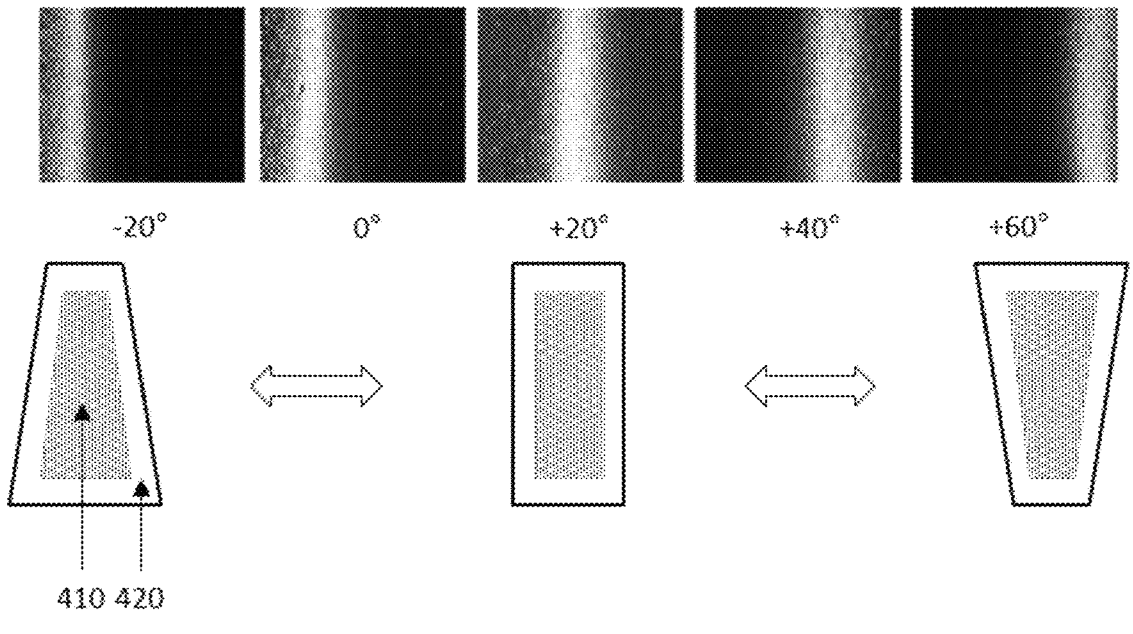
FIG. 4E shows pictures of an OEL obtained by using the magnetic assembly (400) illustrated in FIG. 4A-D, as seen from a fixed position as the sample is tilted from −20° to +60°.

The resulting OEL produced with the static magnetic assembly (400) illustrated in FIG. 4A-D is shown in FIG. 4E at different viewing angles by tilting the substrate (420) between −20° and +60°. The so-obtained OEL provides the optical impression of a bright reflective vertical bar moving laterally upon tilting of the substrate (420).

FIG. 5A-D illustrates an example of a magnetic assembly (500) suitable for producing optical effect layers (OELs) comprising non-spherical oblate magnetic or magnetizable pigment particles on a substrate (520) according to the present invention. The magnetic assembly (500) comprises a first magnetic-field generating device (530) comprising two sets of two, i.e. four, spaced apart bar dipole magnets (531-*a*1, 531-*a*2, 531-*b*1, 531-*b*2) and a second magnetic-field generating device (540) comprising a square-shaped dipole magnet (541).

Figure 5B:
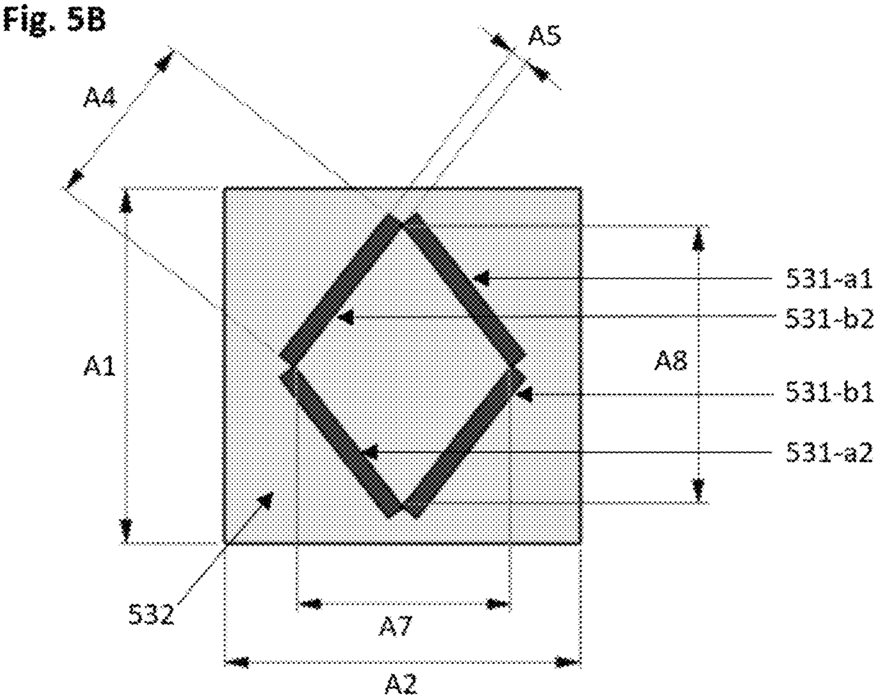

As shown in FIG. 5A-B, the four bar dipole magnets (531-*a*1, 531-*a*2, 531-*b*1, 531-*b*2) of the first magnetic-field generating device (530) have a magnetic axis substantially parallel to the substrate (520) surface and are embedded in a square-shaped supporting matrix (532). For each set of the two sets, the two bar dipole magnets preferably have the same shape, the same dimensions and are made of the same material, in particular, the four bar dipole magnets (531-*a*1, 531-*a*2, 531-*b*1, 531-*b*2) have the same shape, the same dimensions and are made of the same material.

As shown in FIG. 5A-B, the first set (a) of the two sets comprises two bar dipole magnets (531-*a*1, 531-*a*2) that are substantially parallel to each other and that have their North pole pointing in a same first direction and the second set (b) of the two sets comprises two bar dipole magnets (531-*b*1, 531-*b*2) that are substantially parallel to each other and that have their North pole pointing in a same second direction. The four bar dipole magnets (531-*a*1, 531-*a*2, 531-*b*1, 531-*b*2) are arranged in a loop-shaped form, in particular a diamond-shaped form.

The square-shaped dipole magnet (541) of the second magnetic-field generating device (540) is placed on top of the four bar dipole magnets (531-*a*1, 531-*a*2, 531-*b*1, 531-*b*2) of the first magnetic-field generating device (530); i.e. the square-shaped dipole magnet (541) is placed between the four bar dipole magnets (531-*a*1, 531-*a*2, 531-*b*1, 531-*b*2) and the substrate (520).

As shown in FIG. 5D1-3, the four bar dipole magnets (531-*a*1, 531-*a*2, 531-*b*1, 531-*b*2) are disposed in such a way that the vector sum H1 of the magnetic axes ($h_{531\text{-}a1}$, $h_{531\text{-}a2}$, $h_{531\text{-}b1}$, $h_{531\text{-}b2}$) of said four bar dipole magnets (531-*a*1, 531-*a*2, 531-*b*1, 531-*b*2) makes an angle $\alpha$ between 5° and about 175°, preferably between 60° and about 120°, in particular 90°, with the magnetic axis H2 of the square-shaped dipole magnet (541).

The distance (d) between the lower surface of the square-shaped dipole magnet (541) and the upper surface of the four bar dipole magnets (531-*a*1, 531-*a*2, 531-*b*1, 531-*b*2) is preferably between about 0 and about 10 mm, more preferably between about 0 and about 5 mm and is still more preferably about 0, i.e. the square-shaped dipole magnet (541) and the four bar dipole magnets (531-*a*1, 531-*a*2, 531-*b*1, 531-*b*2) are in direct contact.

The distance (h) between the upper surface of the square-shaped dipole magnet (541) and the surface of the substrate (520) facing the magnetic assembly (500) is preferably between about 0.5 mm and about 10 mm, more preferably between about 0.5 mm and about 7 mm and still more preferably between about 1 mm and 7 mm.

Figure 5C:
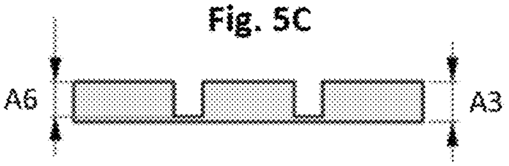
Figures 1, 5D:
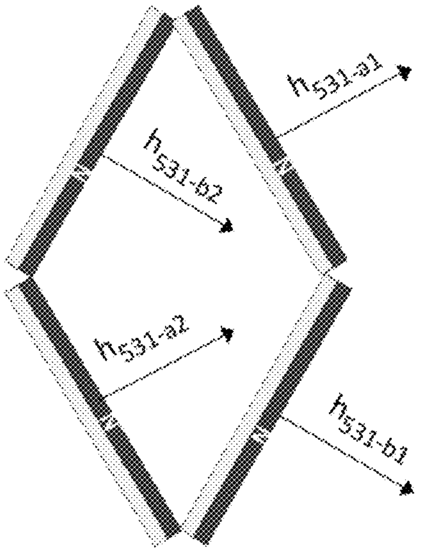
Figures 3, 5D:
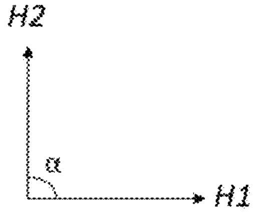
Figures 2, 5D:
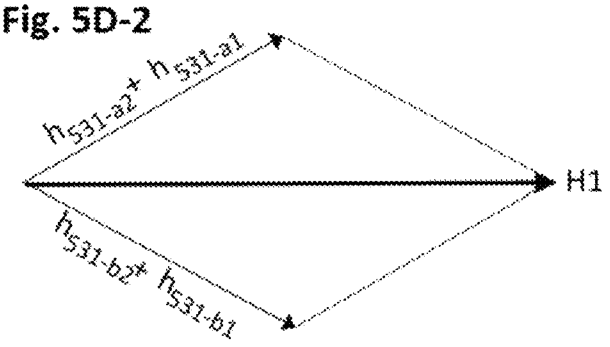
Figure 5E:
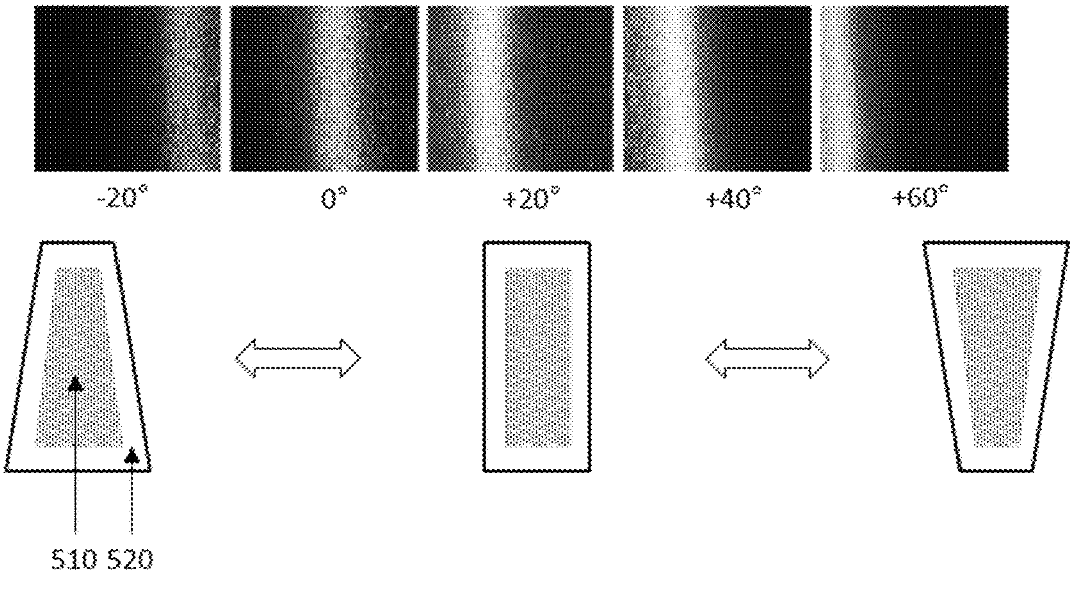
FIG. 5E shows pictures of an OEL obtained by using the magnetic assembly (500) illustrated in FIG. 5A-D, as seen from a fixed position as the sample is tilted from −20° to +60°.

The resulting OEL produced with the static magnetic assembly (500) illustrated in FIG. 5A-C is shown in FIG. 5E at different viewing angles by tilting the substrate (520) between 20° and +60°. The so-obtained OEL provides the optical impression of a bright reflective vertical bar moving laterally upon tilting of the substrate (520).

The present invention further provides printing apparatuses comprising a rotating magnetic cylinder and the one or more magnetic assemblies (x00) described herein, wherein said one or more magnetic assemblies (x00) are mounted to circumferential or axial grooves of the rotating magnetic cylinder as well as printing assemblies comprising a flatbed printing unit and one or more of the magnetic assemblies (x00) described herein, wherein said one or more magnetic assemblies are mounted to recesses of the flatbed printing unit. The present invention further provides uses of said printing apparatuses for producing the optical effect layers (OELs) described herein on a substrate such as those described herein.

The rotating magnetic cylinder is meant to be used in, or in conjunction with, or being part of a printing or coating equipment, and bearing one or more magnetic assemblies described herein. In an embodiment, the rotating magnetic cylinder is part of a rotary, sheet-fed or web-fed industrial printing press that operates at high printing speed in a continuous way.

The flatbed printing unit is meant to be used in, or in conjunction with, or being part of a printing or coating equipment, and bearing one or more of the magnetic assemblies described herein. In an embodiment, the flatbed printing unit is part of a sheet-fed industrial printing press that operates in a discontinuous way.

The printing apparatuses comprising the rotating magnetic cylinder described herein or the flatbed printing unit described herein may include a substrate feeder for feeding a substrate such as those described herein having thereon a layer of non-spherical oblate magnetic or magnetizable pigment particles described herein, so that the magnetic assemblies generate a magnetic field that acts on the pigment particles to orient them to form the OEL described herein. In an embodiment of the printing apparatuses comprising a rotating magnetic cylinder described herein, the substrate is fed by the substrate feeder under the form of sheets or a web. In an embodiment of the printing apparatuses comprising a flatbed printing unit described herein, the substrate is fed under the form of sheets.

The printing apparatuses comprising the rotating magnetic cylinder described herein or the flatbed printing unit described herein may include a coating or printing unit for applying the radiation curable coating composition comprising the non-spherical oblate magnetic or magnetizable pigment particles described herein on the substrate described herein, the radiation curable coating composition comprising non-spherical oblate magnetic or magnetizable pigment particles that are oriented by the magnetic-field generated by the magnetic assemblies described herein to form an optical effect layer (OEL). In an embodiment of the printing apparatuses comprising a rotating magnetic cylinder described herein, the coating or printing unit works according to a rotary, continuous process. In an embodiment of the printing apparatuses comprising a flatbed printing unit described herein, the coating or printing unit works according to a linear, discontinuous process.

The printing apparatuses comprising the rotating magnetic cylinder described herein or the flatbed printing unit described herein may include a curing unit for at least partially curing the radiation curable coating composition comprising non-spherical oblate magnetic or magnetizable pigment particles that have been magnetically oriented by the magnetic assemblies described herein, thereby fixing the orientation and position of the non-spherical oblate magnetic or magnetizable pigment particles to produce an optical effect layer (OEL).

The shape of the coating layer (x10) of the optical effect layers (OELs) described herein may be continuous or discontinuous. According to one embodiment, the shape of the coating layer (x10) represent one or more indicia, dots and/or lines. The shape of the coating layer (x10) may consist of lines, dots and/or indicia being spaced apart from each other by a free area.

The optical effect layers (OELs) described herein may be provided directly on a substrate on which they shall remain permanently (such as for banknote applications). Alternatively, an OEL may also be provided on a temporary substrate for production purposes, from which the OEL is subsequently removed. This may for example facilitate the production of the OEL, particularly while the binder material is still in its fluid state. Thereafter, after at least partially curing the coating composition for the production of the OEL, the temporary substrate may be removed from the OEL.

Alternatively, an adhesive layer may be present on the OEL or may be present on the substrate comprising an OEL, said adhesive layer being on the side of the substrate opposite the side where the OEL is provided or on the same side as the OEL and on top of the OEL. Therefore an adhesive layer may be applied to the OEL or to the substrate. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OEL are produced as described herein. One or more adhesive layers may be applied over the so produced OEL.

Also described herein are substrates such as those described herein comprising more than one, i.e. two, three, four, etc. optical effect layers (OELs) obtained by the process described herein.

Also described herein are articles, in particular security documents, decorative elements or objects, comprising the optical effect layer (OEL) produced according to the present invention. The articles, in particular security documents, decorative elements or objects, may comprise more than one (for example two, three, etc.) OELs produced according to the present invention.

As mentioned herein, the optical effect layer (OEL) produced according to the present invention may be used for decorative purposes as well as for protecting and authenticating a security document. Typical examples of decorative elements or objects include without limitation luxury goods, cosmetic packaging, automotive parts, electronic/electrical appliances, furniture and fingernail lacquers.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompasses by the present invention.

Further, all documents referred to throughout this specification are hereby incorporated by reference in their entirety as set forth in full herein.

EXAMPLES

Magnetic assemblies (x00) illustrated in FIG. 2A-D to FIG. 5A-D were used to orient non-spherical oblate optically variable magnetic pigment particles in a coating, in particular printed, layer (x10) of the UV-curable screen printing ink described in Table 1 so as to produce optical effect layers (OELs) shown in FIG. 2E-5E. The UV-curable screen printing ink was applied onto a black commercial paper (Gascogne Laminates M-cote 120) (x20), said application being carried out by hand screen printing using a T90 screen so as to form a coating layer having a thickness of about 20 µm. The substrate carrying the applied layer of the UV-curable screen printing ink was placed on the magnetic assembly. The so-obtained magnetic orientation pattern of the platelet-shaped optically variable pigment particles was then, partially simultaneously with the orientation step, (i.e. while the substrate (x20) carrying the coating layer (x10) of the UV-curable screen printing ink was still in the static magnetic field of the magnetic assembly (x00)), fixed by exposing for about 0.5 second to UV-curing the layer comprising the pigment particles using a UV-LED-lamp from Phoseon (Type FireFlex 50×75 mm, 395 nm, 8 W/cm$^2$).

TABLE 1

| UV-curable screen printing ink (coating composition): | |
|---|---|
| Epoxyacrylate oligomer | 28% |
| Trimethylolpropane triacrylate monomer | 19.5% |
| Tripropyleneglycol diacrylate monomer | 20% |
| Genorad 16 (Rahn) | 1% |
| Aerosil 200 (Evonik) | 1% |
| Speedcure TPO-L (Lambson) | 2% |
| Irgacure ® 500 (BASF) | 6% |
| Genocure ® EPD (Rahn) | 2% |
| BYK ® 371 (BYK) | 2% |
| Tego Foamex N (Evonik) | 2% |
| 7-layer optically variable magnetic pigment particles (*) | 16.5% |

(*) gold-to-green optically variable magnetic pigment particles having a flake shape (platelet-shaped pigment particles) of diameter d50 about 9 μm and thickness about 1 μm, obtained from Viavi Solutions, Santa Rosa, CA.

Example 1 (FIG. 2A-E)

The magnetic assembly (200) used to prepare the optical effect layer (OEL) of Example 1 on the substrate (220) is illustrated in FIG. 2A-D.

The magnetic assembly (200) comprised a first magnetic-field generating device (230) comprising one set of two spaced apart bar dipole magnets (231-*a*1, 231-*a*2) embedded in a square-shaped supporting matrix (232) and a second magnetic-field generating device (240) comprising a square-shaped dipole magnet (241), wherein the second magnetic-field generating device (240) was placed on top of the first magnetic-field generating device (230).

The two bar dipole magnets (231-*a*1, 231-*a*2) of the first magnetic-field generating device (230) had their respective magnetic axis ($h_{231\text{-}a1}$, $h_{231\text{-}a2}$) substantially parallel to the substrate (220) surface (i.e. they were magnetized through their width A5) and had their North pole pointing in the same direction. The two bar dipole magnets (231-*a*1, 231-*a*2) of the magnetic assembly (230) had the following dimensions: 30 mm (A4)×3 mm (A5)×6 mm (A6) and were made of NdFeB N42. Said two bar dipole magnets (231-*a*1, 231-*a*2) were substantially parallel to each other and the distance (A11) between them was 15 mm. The multiple M, which expresses the ratio of the distance between the two bar dipole magnets (231*a*1, 231-*a*2) and the thickness of said bar dipole magnets (231-*a*1, 231-*a*2), is calculated as A11/A5 and equals to 5.

The square-shaped supporting matrix (232) had the following dimensions: 40 mm (A1)×40 mm (A2)×7 mm (A3) and was made of polyoxymethylene (POM).

The square-shaped dipole magnet (241) of the second magnetic-field generating device (240) had its North-South magnetic axis substantially parallel to the substrate (220) surface (i.e. it was magnetized through its length B1). The square-shaped dipole magnet (241) had the following dimensions: 30 mm (B1)×30 mm (B2)×2 mm (B3). The square-shaped dipole magnet (241) was made of NdFeB NdFeB N52.

The first magnetic-field generating device (230) and the second magnetic-field generating device (240) were arranged in such a way that the center of the parallel arrangement of the two bar dipole magnets (231-*a*1, 231-*a*2) of the first magnetic assembly (230) was aligned with the center of the square-shaped bar dipole magnet (241) of the second magnetic assembly (240).

The distance (d) between the lower surface of the square-shaped bar dipole magnet (241) of the second magnetic-field generating device (240) and the upper surface of the two bar dipole magnets (231-*a*1, 231-*a*2) of the first magnetic-field generating device (230) was 0 mm, i.e. the two bar dipole magnets (231-*a*1, 231-*a*2) and the square-shaped bar dipole magnet (241) were in direct contact. The distance (h) between the upper surface of square-shaped bar dipole magnet (241) of the second magnetic-field generating device (240) and the surface of the substrate (220) facing the ring-shaped dipole magnet was about 2.5 mm.

The two substantially parallel bar dipole magnets (231-*a*1, 231-*a*2) were disposed in such a way that they formed an angle β(=90°−α) of 22° with the length (A1) of the square-shaped supporting matrix (232) and that, as shown in FIG. 2D1-2D3, the vector sum H1 of the magnetic axes ($h_{231\text{-}a1}$ and $h_{231\text{-}a2}$) of said two bar dipole magnets (231-*a*1, 231-*a*2) made an angle α of 68° with the magnetic axis H2 of the square-shaped dipole magnet (241).

The resulting OEL produced with the magnetic assembly (200) illustrated in FIG. 2A-C is shown in FIG. 2E at different viewing angles by tilting the substrate (220) between −20° and +20°. The so-obtained OEL exhibited an ortho-parallactic effect and provided the optical impression of a bright reflective vertical bar moving laterally upon tilting of the substrate (220), in particular moving from right to left from −20° to +20°.

Example 2 (FIG. 3A-E)

The magnetic assembly (300) used to prepare the optical effect layer (OEL) of Example 2 on the substrate (320) is illustrated in FIG. 3A-D.

The magnetic assembly (300) comprised a first magnetic-field generating device (330) comprising one set of two bar dipole magnets (331-*a*1, 331-*a*2) embedded in a square-shaped supporting matrix (332); a second magnetic-field generating device (340) comprising a square-shaped dipole magnet (341); and a square-shaped pole piece (350), wherein the second magnetic-field generating device (340) was placed on top of the first magnetic-field generating device (330) and wherein the first magnetic-field generating device (330) was placed on top of the square-shaped pole piece (350).

The two bar dipole magnets (331-*a*1, 331-*a*2) of the first magnetic-field generating device (330) had their respective magnetic axis (h331-*a*1, h331-*a*2) substantially parallel to the substrate (320) surface (i.e. they were magnetized through their width (A5)) and had their North pole pointing in the same direction. The two bar dipole magnets (331-*a*1, 331-*a*2) of the magnetic assembly (330) had the following dimensions: 40 mm (A4)×3 mm (A5)×6 mm (A6) and were made of NdFeB N45. Said two bar dipole magnets (331-*a*1, 331-*a*2) were substantially parallel to each other and the distance (A11) between them was 21 mm. The multiple M, which expresses the ratio of the distance between the two bar dipole magnets (331*a*1, 331-*a*2) and the thickness of said bar dipole magnets (331-*a*1, 331-*a*2), is calculated as A11/A5 and equals to 7.

The square-shaped supporting matrix (332) had the following dimensions: 50 mm (A1)×50 mm (A2)×8 mm (A3) and was made of polyoxymethylene (POM).

The square-shaped dipole magnet (341) of the second magnetic-field generating device (340) had its North-South magnetic axis substantially parallel to the substrate (320) surface (i.e. it was magnetized through its length B1). The square-shaped dipole magnet (341) had the following dimensions: 38 mm (B1)×38 mm (B2)×2 mm (B3). The square-shaped dipole magnet (341) was made of NdFeB N42.

The square-shaped pole piece (350) was made of pure iron had the following dimensions: 40 mm (C1)×40 mm (C2)×1 mm (C3).

The first magnetic-field generating device (330), the second magnetic-field generating device (340) and the square-shaped pole piece (350) were arranged in such a way that the center of the parallel arrangement of the bar dipole magnets (331-*a*1, 331-*a*2) of the first magnetic assembly (330) was aligned with the center of the square-shaped bar dipole magnet (341) of the second magnetic assembly (340) and that the center of the parallel arrangement of the bar dipole magnets (331-*a*1, 331-*a*2) of the first magnetic assembly (330) was aligned with the center of the square-shaped pole piece (350).

The distance (d) between the lower surface of the square-shaped bar dipole magnet (341) of the second magnetic-field generating device (340) and the upper surface of the two bar dipole magnets (331-*a*1, 331-*a*2) of the first magnetic-field generating device (340) was about 0 mm, i.e. the two bar dipole magnets (331-*a*1, 331-*a*2) and the square-shaped bar dipole magnet (341) were in direct contact. The distance (h) between the upper surface of the square-shaped bar dipole magnet (341) of the second magnetic-field generating device (340) and the surface of the substrate (320) facing the square-shaped dipole magnet (341) was about 2.5 mm. The distance (e) between the upper surface of the square-shaped pole piece (350) and the lower surface of the square-shaped supporting matrix (332) was 0 mm, i.e. there was a distance (A3-A6) of about 2 mm between the two bar dipole magnets (331-*a*1, 331-*a*2) of the first magnetic-field generating device (340) and the square-shaped pole piece (350).

The two bar dipole magnets (331-*a*1, 331-*a*2) were disposed in such a way that the vector sum H1 of the two magnetic axes ($h_{331\text{-}a1}$ and $h_{331\text{-}a2}$) of said two bar dipole magnets (331-*a*1, 331-*a*2) made an angle α of 90° with the magnetic axis H2 of the square-shaped dipole magnet (341).

The resulting OEL produced with the magnetic assembly (300) illustrated in FIG. 3A-D is shown in FIG. 3E at different viewing angles by tilting the substrate (320) between −20° and +20°. The so-obtained OEL exhibited an ortho-parallactic effect and provided the optical impression of a bright reflective vertical bar moving laterally upon tilting of the substrate (20), in particular moving from right to left from −20° to +20°.

Example 3 (FIG. 4A-E)

The magnetic assembly (400) used to prepare the optical effect layer (OEL) of Example 3 on the substrate (420) is illustrated in FIG. 4A-D.

The magnetic assembly (400) comprised a first magnetic-field generating device (430) comprising two (a, b) sets of two spaced apart bar dipole magnets (431-*a*1, 431-*a*2, 431-*b*1, 431-*b*2) embedded in a square-shaped supporting matrix (432) and a second magnetic-field generating device (440) comprising a square-shaped dipole magnet (441), wherein the second magnetic-field generating device (440) was placed on top of the first magnetic-field generating device (430).

The four dipole magnets (431-*a*1, 431-*a*2, 431-*b*1, 431-*b*2) of the first magnetic-field generating device (430) had their respective magnetic axis ($h_{431\text{-}a1}$, $h_{431\text{-}a2}$, $h_{431\text{-}b1}$, $h_{431\text{-}b2}$) substantially parallel to the substrate (420) surface (i.e. they were magnetized through their width A5). The first set (a) comprised two dipole magnets (431-*a*1, 431-*a*2) having their North pole pointing in a same first direction and the second set (b) comprised two dipole magnets (431-*b*1, 431-*b*2) having their North pole pointing in a same second direction.

The four bar dipole magnets (431-*a*1, 431-*a*2, 431-*b*1, 431-*b*2) of the first (a) and second (b) sets of the magnetic assembly (430) had the following dimensions: 30 mm (A4)×3 mm (A5)×6 mm (A6) and were made of NdFeB N42. The four bar dipole magnets (431-*a*1, 431-*a*2, 431-*b*1, 431-*b*2) were arranged in a square-shaped form, wherein said magnets (431-*a*1, 431-*a*2, 431-*b*1, 431-*b*2) were disposed in the square-shaped supporting matrix (432) in such a way that the symmetry axis parallel to the magnets (431*b*-1 and 431-*b*2) made an angle β=22.5° with the length (A1) of the square-shaped supporting matrix (432). The multiple M, which expresses the ratio of the distance between two bar dipole magnets for each set (431-*a*1/431-*a*2 and 431-*b*1/431-*b*2) and the thickness of said bar dipole magnets (431-*a*1, 431-*a*2, 431-*b*1, 431-*b*2), is calculated as A4/A5 and equals to 10.

The square-shaped supporting matrix (432) had the following dimensions: 50 mm (A1)×50 mm (A2)×7 mm (A3) and was made of polyoxymethylene (POM).

The square-shaped dipole magnet (441) of the second magnetic-field generating device (440) had its North-South magnetic axis substantially parallel to the substrate (420) surface (i.e. it was magnetized through its length B1). The square-shaped dipole magnet (441) had the following dimensions: 38 mm (B1)×38 mm (B2)×2 mm (B3). The square-shaped dipole magnet (441) was made of NdFeB N42.

The first magnetic-field generating device (430) and the second magnetic-field generating device (440) were arranged in such a way that the center of the square-shaped arrangement formed by the four bar dipole magnets (431-*a*1, 431-*a*2, 431-*b*1, 431-*b*2) of the first magnetic assembly (430) was aligned with the center of the square-shaped bar dipole magnet (441) of the second magnetic assembly (440).

The distance (d) between the lower surface of the square-shaped bar dipole magnet (441) of the second magnetic-field generating device (440) and the upper surface of the four bar dipole magnets (431-*a*1, 431-*a*2, 431-*b*1, 431-*b*2) of the first magnetic-field generating device (440) was 0 mm, i.e. the four bar dipole magnets (431-*a*1, 431-*a*2, 431-*b*1, 431-*b*2) and the square-shaped bar dipole magnet (441) were in direct contact. The distance (h) between the upper surface of the square-shaped bar dipole magnet (441) of the second magnetic-field generating device (440) and the surface of the substrate (420) facing the square-shaped bar dipole magnet (441) was about 2 mm.

The four bar dipole magnets (431-*a*1, 431-*a*2, 431-*b*1, 431-*b*2) were disposed in such a way that the vector sum H1 of the magnetic axes ($h_{431\text{-}a1}$, $h_{431\text{-}a2}$, $h_{431\text{-}b1}$ and $h_{431\text{-}b2}$) of said four bar dipole magnets (431-*a*1, 431-*a*2, 431-*b*1, 431-*b*2) made an angle α of 247.5° with the magnetic axis H2 of the square-shaped dipole magnet (441).

The resulting OEL produced with the magnetic assembly (400) illustrated in FIG. 4A-D is shown in FIG. 4E at different viewing angles by tilting the substrate (420) between −20° and +60°. The so-obtained OEL exhibited an ortho-parallactic effect and provided the optical impression of a bright reflective vertical bar moving laterally upon tilting of the substrate (420), in particular moving from left to right from −20° to +60°.

Example 4 (FIG. 5A-E)

The magnetic assembly (500) used to prepare the optical effect layer (OEL) of Example 4 on the substrate (520) is illustrated in FIG. 5A-D.

The magnetic assembly (500) comprised a first magnetic-field generating device (530) comprising two (a, b) sets of two spaced apart bar dipole magnets (531-*a*1, 531-*a*2, 531-*b*1, 531-*b*2) embedded in a square-shaped supporting matrix (532) and a second magnetic-field generating device (540) comprising a square-shaped dipole magnet (541), wherein the second magnetic-field generating device (540) was placed on top of the first magnetic-field generating device (530).

The four dipole magnets (531-*a*1, 531-*a*2, 531-*b*1, 531-*b*2) of the first magnetic-field generating device (530) had their respective magnetic axis ($h_{531\text{-}a1}$, $h_{531\text{-}a2}$, $h_{531\text{-}b1}$, $h_{531\text{-}b2}$) substantially parallel to the substrate (520) surface (i.e. they were magnetized through their width A5). The first set (a) comprised two dipole magnets (531*a*1, 531-*a*2) being substantially parallel to each other and having their North pole pointing in a same first direction and the second set (b) comprised two dipole magnets (531*b*1, 531-*b*2) being substantially parallel to each other and having their North pole pointing in a same second direction.

The four bar dipole magnets (531-*a*1, 531-*a*2, 531-*b*1, 531-*b*2) of the first (a) and second (b) sets of the magnetic assembly (530) had the following dimensions: 30 mm (A4)×3 mm (A5)×6 mm (A6) and were made of NdFeB N42. The four bar dipole magnets (531-*a*1, 531-*a*2, 531-*b*1, 531-*b*2) were arranged in a diamond-shaped form, with the shortest diagonal having a dimension (A7) of 36.6 mm and the longest diagonal having a dimension (A8) of 47.6 mm. The multiple M, which expresses the ratio of the distance between two bar dipole magnets for each set (531-*a*1/531-*a*2 and 531-*b*1/531-*b*2) and the thickness (A5) of said bar dipole magnets (531-*a*1, 531-*a*2, 531-*b*1, 531-*b*2), is calculated from A4, A5 and A7 (or A8) and equals 9.7, wherein $$M = \frac{A4}{A5}\sin\left[2\sin^{-1}\left(\frac{1}{2}\frac{A7}{A4}\right)\right] = \frac{A4}{A5}\sin\left[2\cos^{-1}\left(\frac{1}{2}\frac{A8}{A4}\right)\right]$$

The square-shaped supporting matrix (532) had the following dimensions: 50 mm (A1)×50 mm (A2)×7 mm (A3) and was made of polyoxymethylene (POM).

The square-shaped dipole magnet (541) of the second magnetic-field generating device (540) had their North-South magnetic axis substantially parallel to the substrate (520) surface (i.e. they were magnetized through its length (B1)). The square-shaped dipole magnet (541) had the following dimensions: 38 mm (B1)×38 mm (B2)×2 mm (B3). The square-shaped dipole magnet (541) was made of NdFeB N42.

The first magnetic-field generating device (530) and the second magnetic-field generating device (540) were arranged in such a way that the center of the diamond-looped shape arrangement formed by the four bar dipole magnets (531-*a*1, 531-*a*2, 531-*b*1, 531-*b*2) of the first magnetic assembly (530) was aligned with the center of the square-shaped bar dipole magnet (541) of the second magnetic assembly (540).

The distance (d) between the lower surface of the square-shaped bar dipole magnet (541) of the second magnetic-field generating device (540) and the upper surface of the four bar dipole magnets (531-*a*1, 531-*a*2, 531-*b*1, 531-*b*2) of the first magnetic-field generating device (530) was 0 mm, i.e. the four bar dipole magnets (531-*a*1, 531-*a*2, 531-*b*1, 531-*b*2) and the square-shaped bar dipole magnet (541) were in direct contact. The distance (h) between the upper surface of the square-shaped bar dipole magnet (541) of the second magnetic-field generating device (540) and the surface of the substrate (520) facing the square-shaped bar dipole magnet (541) was about 2 mm.

The four bar dipole magnets (531-*a*1, 531-*a*2, 531-*b*1, 531-*b*2) were disposed in such a way that the vector sum H1 of the magnetic axes ($h_{531\text{-}a1}$, $h_{531\text{-}a2}$, $h_{531\text{-}b1}$ and $h_{531\text{-}b2}$) of said four bar dipole magnets (531-*a*1, 531-*a*2, 531-*b*1, 531-*b*2) made an angle α of 90° with the magnetic axis H2 of the square-shaped dipole magnet (541).

The resulting OEL produced with the magnetic assembly (500) illustrated in FIG. 5A-D is shown in FIG. 5E at different viewing angles by tilting the substrate (520) between −20° and +60°. The so-obtained OEL exhibited an ortho-parallactic effect and provided the optical impression of a bright reflective vertical bar moving laterally upon tilting of the substrate (520), in particular moving from right to left from −20° to +60°.

The invention claimed is:

1. A magnetic assembly for producing an optical effect layer on a substrate surface, comprising:

a) a first magnetic-field generating device comprising n sets of spaced apart bar dipole magnets, with n being an integer equal to or bigger than 1, wherein each of said bar dipole magnets has its North-South magnetic axis substantially parallel to the substrate surface, wherein, for each set of said n sets, bar dipole magnets have their North pole pointing in a same direction and are substantially parallel to each other, and wherein the bar dipole magnets of the first magnetic-field generating device are at least partially or fully embedded in a polygonal-shaped supporting matrix, and b) a second magnetic-field generating device comprising one or more square-shaped or rectangle-shaped dipole magnets having their North-South magnetic axis substantially parallel to the substrate surface;

wherein the vector sum H1 of the magnetic axes of the bar dipole magnets of the first magnetic-field generating device and the vector sum H2 of the one or more square-shaped or rectangle-shaped dipole magnets form an angle α in the range from about 5° to about 175° or in the range from about 185° to about 355°, wherein the first magnetic-field generating device is placed below or on top of the second magnetic-field generating device, and wherein the first magnetic-field generating device and the second magnetic-field generating device are coaxial with respect to one another.

2. The magnetic assembly according to claim 1, wherein the first magnetic-field generating device comprises n sets of spaced apart bar dipole magnets, wherein said n sets of bar dipole magnets are arranged in a loop-shaped form.

3. The magnetic assembly according to claim 2, wherein the first magnetic-field generating device comprises two sets of two spaced apart bar dipole magnets.

4. The magnetic assembly according to claim 3, wherein the two sets of two spaced apart bar dipole magnets are arranged in a square-shaped form or a diamond-shaped form.

5. The magnetic assembly according to claim 1, wherein for each set of the n sets, the spaced apart bar dipole magnets of the first magnetic-field generating device have the same shape, the same dimensions and are made of the same material.

6. The magnetic assembly according to claim 1, wherein the polygonal-shaped supporting matrix is a square-shaped supporting matrix or a rectangle-shaped supporting matrix.

7. The magnetic assembly according to claim 1, further comprising one or more pole pieces, wherein said one or more pole pieces are placed below the first magnetic-field generating device and below the second magnetic-field generating device.

8. The magnetic assembly according to claim 1, wherein the angle α is in the range from about 60° to about 120° or in the range from about 240° to about 300°.

9. The magnetic assembly according to claim 1, wherein the first magnetic-field generating device comprises n sets of two or more bar dipole magnets.

10. The magnetic assembly according to claim 2, wherein the first magnetic-field generating device comprises n sets of two or more bar dipole magnets, and wherein said n sets of bar dipole magnets are arranged in a square-shaped form or a diamond-shaped form.

11. The magnetic assembly according to claim 7, wherein the one or more pole pieces are square-shaped or rectangle-shaped pole pieces.

12. A printing apparatus comprising a rotating magnetic cylinder or a flatbed printing unit, the rotating magnetic cylinder or the flatbed printing unit comprising at least one magnetic assembly recited in claim 1.

13. A process for producing an optical effect layer on a substrate, the optical effect layer exhibiting an ortho-parallactic effect, said process comprising the steps of:

i) applying on a substrate surface a radiation curable coating composition comprising non-spherical oblate magnetic or magnetizable pigment particles, said radiation curable coating composition being in a first state so as to form a coating layer;

ii) exposing the radiation curable coating composition to a magnetic field of the magnetic assembly recited in claim 1 that is static, so as to orient at least a part of the non-spherical oblate magnetic or magnetizable pigment particles;

iii) at least partially curing the radiation curable coating composition of step ii) to a second state so as to fix the non-spherical oblate magnetic or magnetizable pigment particles in their adopted positions and orientations.

14. The process according to claim 13, wherein step iii) is carried out by UV-Vis light radiation curing.

15. The process according to claim 14, wherein step iii) is carried out partially simultaneously with step ii).

16. The process according to claim 13, wherein at least a part of the plurality of non-spherical oblate magnetic or magnetizable particles is constituted by non-spherical oblate optically variable magnetic or magnetizable pigment particles.

17. The process according to claim 16, wherein the non-spherical optically variable magnetic or magnetizable pigments are selected from the group consisting of magnetic thin-film interference pigments, magnetic cholesteric liquid crystal pigments and mixtures thereof.

18. An optical effect layer produced by the process recited in claim 13.

* * * * *